United States Patent
Spillane et al.

(10) Patent No.: US 7,529,437 B2
(45) Date of Patent: May 5, 2009

(54) SCALABLE AND DEFECT-TOLERANT QUANTUM-DOT-BASED QUANTUM COMPUTER ARCHITECTURES AND METHODS FOR FABRICATING QUANTUM DOTS IN QUANTUM COMPUTER ARCHITECTURES

(75) Inventors: Sean Spillane, Mountain View, CA (US); Charles Santori, Sunnyvale, CA (US); Marco Fiorentino, Mountain View, CA (US); Raymond G. Beausoleil, Jr., Redmond, WA (US); R. Stanley Williams, Redwood City, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 181 days.

(21) Appl. No.: 11/494,814

(22) Filed: Jul. 27, 2006

(65) Prior Publication Data

US 2008/0031296 A1 Feb. 7, 2008

(51) Int. Cl.
*G02B 6/12* (2006.01)
*G02B 6/34* (2006.01)
(52) U.S. Cl. .............................. 385/14; 385/24; 385/37
(58) Field of Classification Search .................. 385/37, 385/14, 24, 129
See application file for complete search history.

(56) References Cited

U.S. PATENT DOCUMENTS

| | | | | |
|---|---|---|---|---|
| 5,991,190 | A * | 11/1999 | Peterson | 365/151 |
| 6,636,668 | B1 * | 10/2003 | Al-hemyari et al. | 385/40 |
| 6,711,200 | B1 * | 3/2004 | Scherer et al. | 372/64 |
| 7,110,640 | B2 * | 9/2006 | LoCascio et al. | 385/27 |
| 7,359,587 | B2 * | 4/2008 | Beausoleil et al. | 385/14 |
| 2004/0037532 | A1 * | 2/2004 | Park et al. | 385/131 |
| 2004/0114867 | A1 * | 6/2004 | Nielsen et al. | 385/40 |
| 2005/0078902 | A1 * | 4/2005 | Beausoleil et al. | 385/1 |
| 2006/0056758 | A1 * | 3/2006 | Beausoleil et al. | 385/14 |
| 2006/0215949 | A1 * | 9/2006 | Lipson et al. | 385/2 |
| 2007/0071386 | A1 * | 3/2007 | Digonnet et al. | 385/32 |
| 2007/0071394 | A1 * | 3/2007 | Faccio et al. | 385/131 |
| 2007/0172235 | A1 * | 7/2007 | Snider et al. | 398/45 |

* cited by examiner

*Primary Examiner*—Michelle R Connelly Cushwa
*Assistant Examiner*—Rhonda S Peace

(57) ABSTRACT

Various embodiments of the present invention are directed to quantum-dot-based quantum computer architectures that are scalable and defect tolerant and to methods for fabricating quantum dots in quantum computer architectures. In one embodiment of the present invention, a node of quantum computer architecture comprises a first photonic device supported by a substrate. The quantum computer architecture also includes a number of quantum dots coupled to the first photonic device, and a switch supported by the substrate that controls transmission of electromagnetic waves between a bus waveguide and the quantum dots.

25 Claims, 38 Drawing Sheets

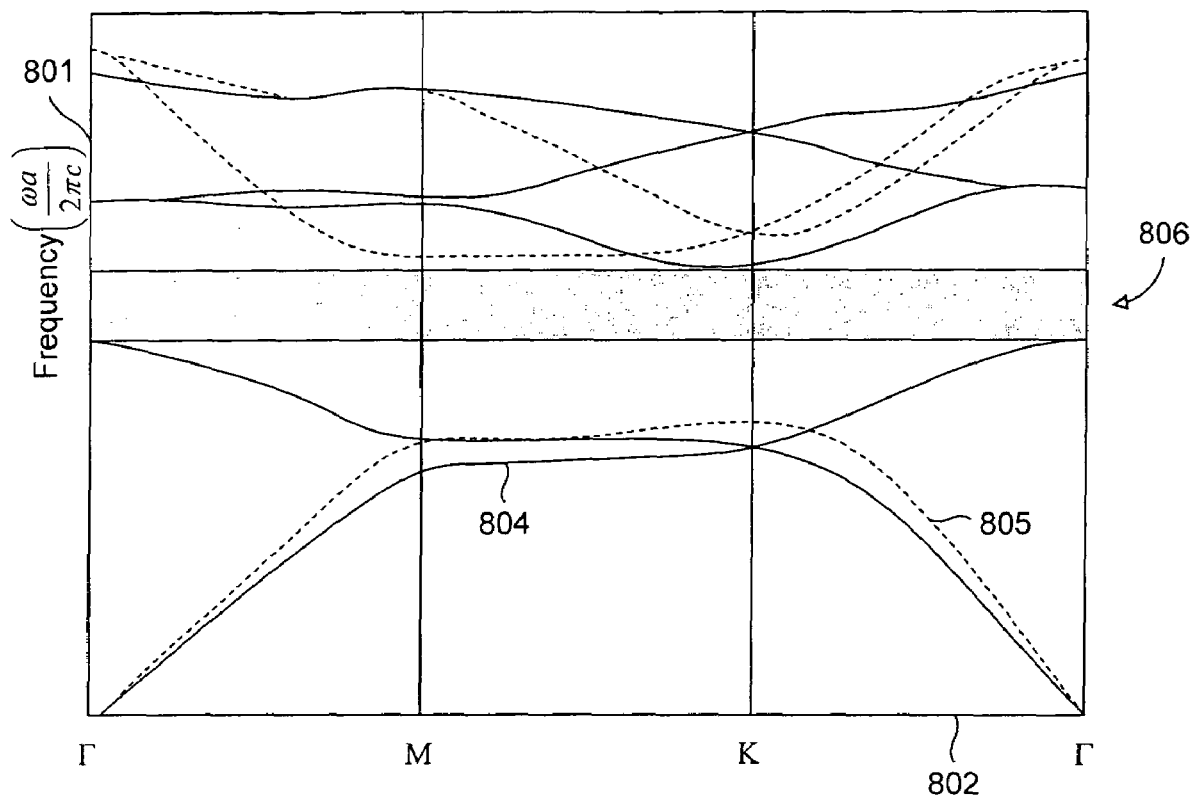
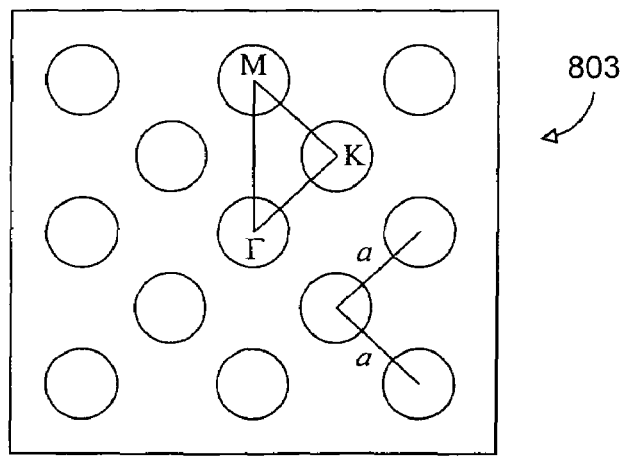
*Figure 8*

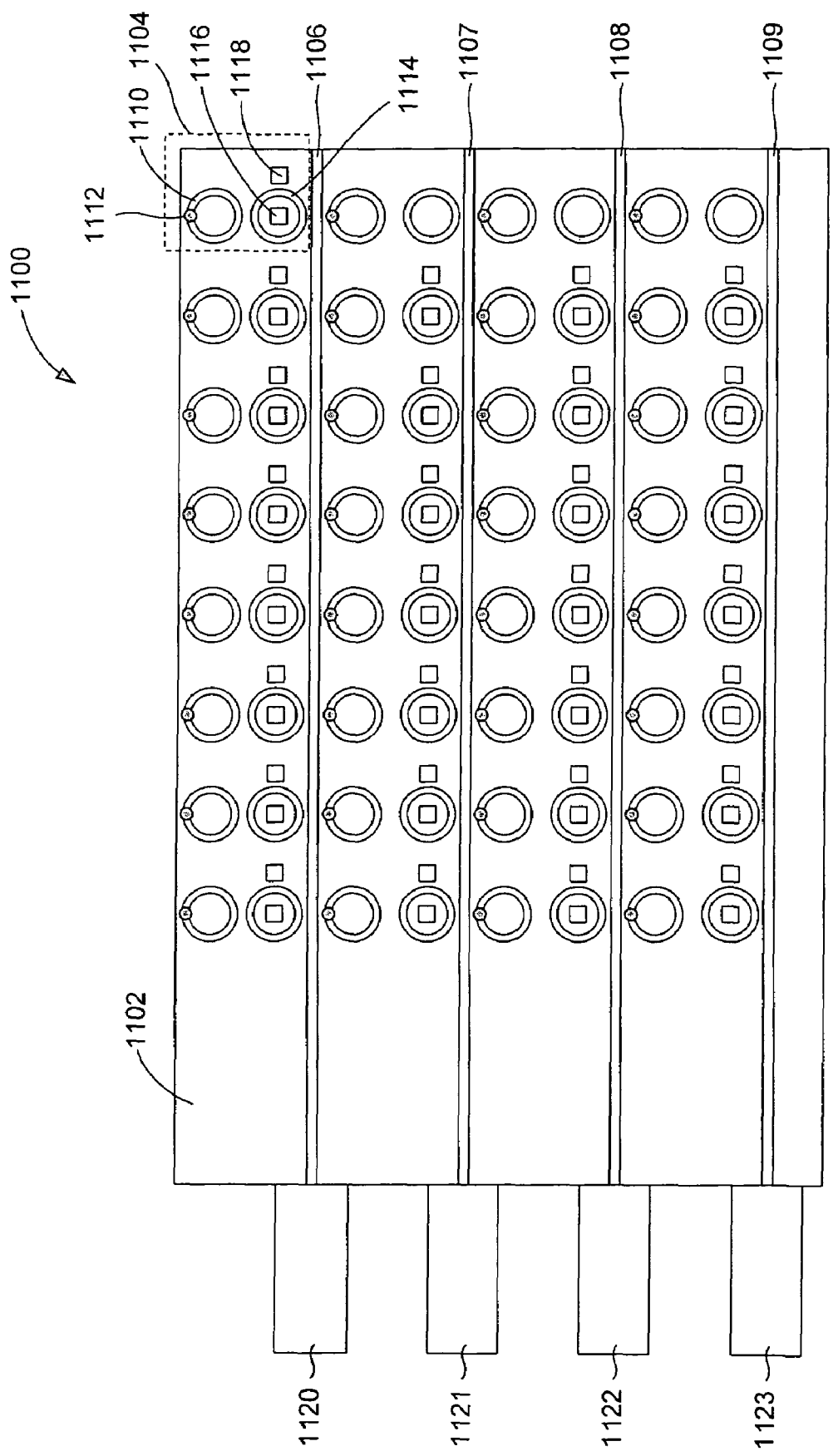

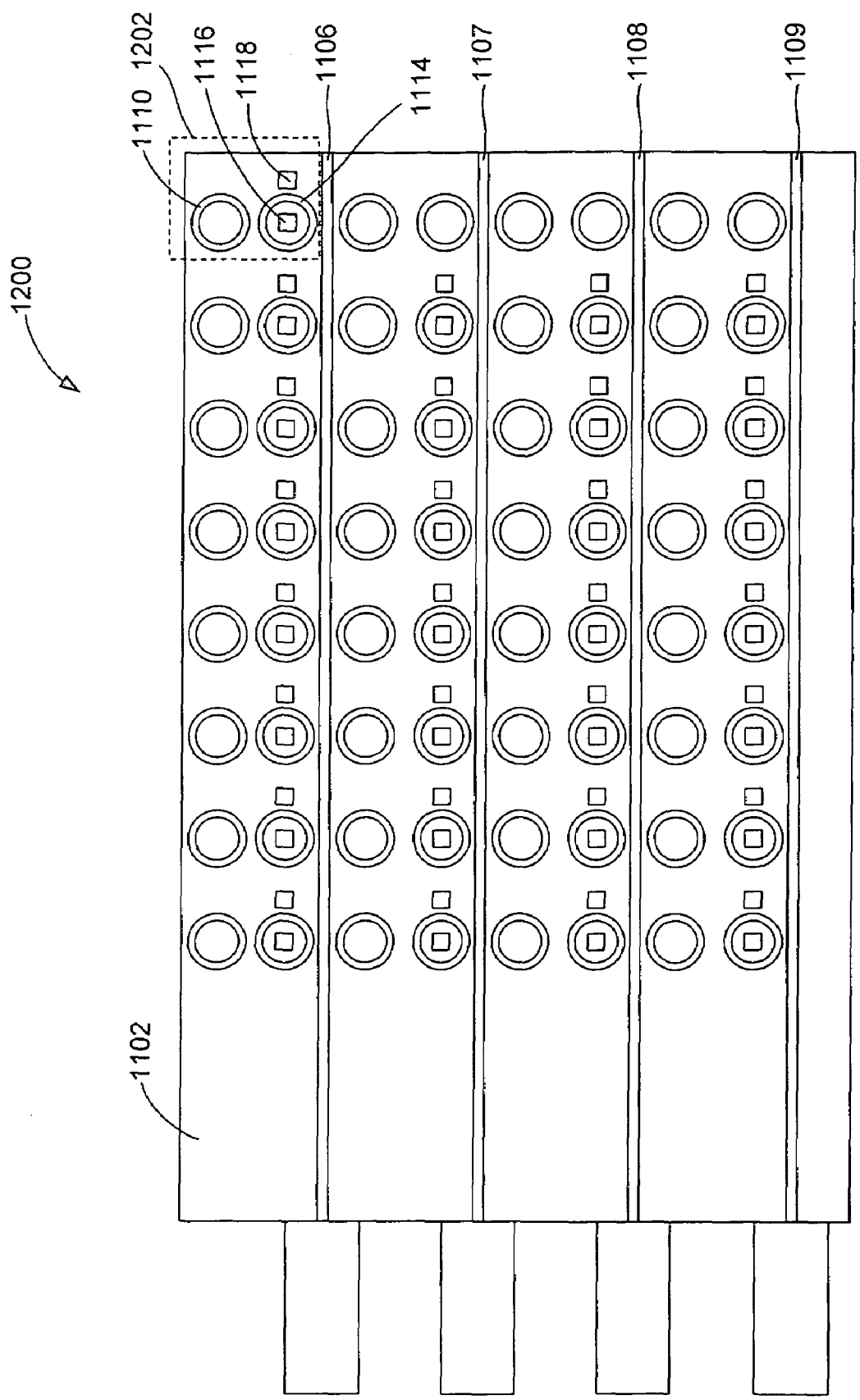

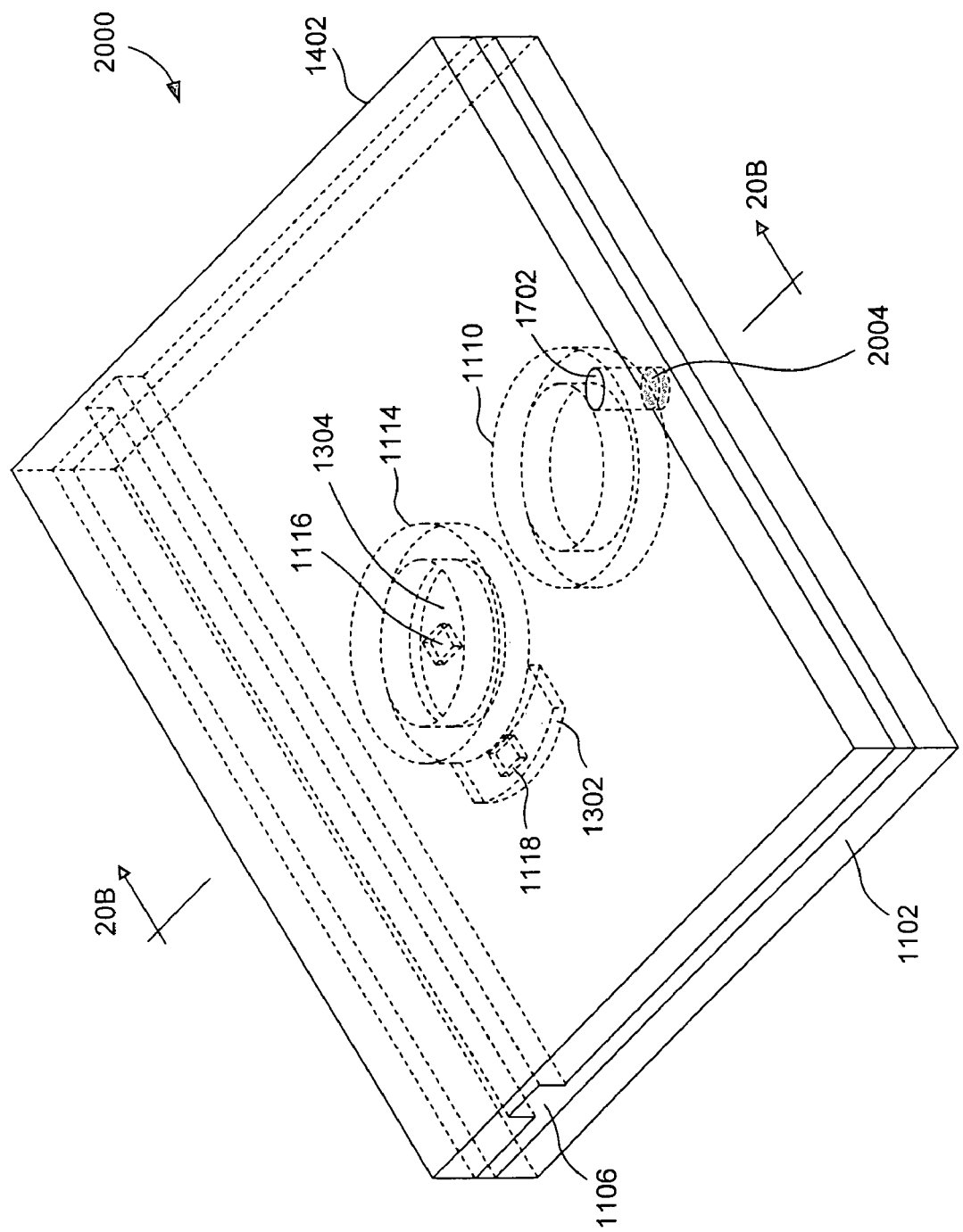

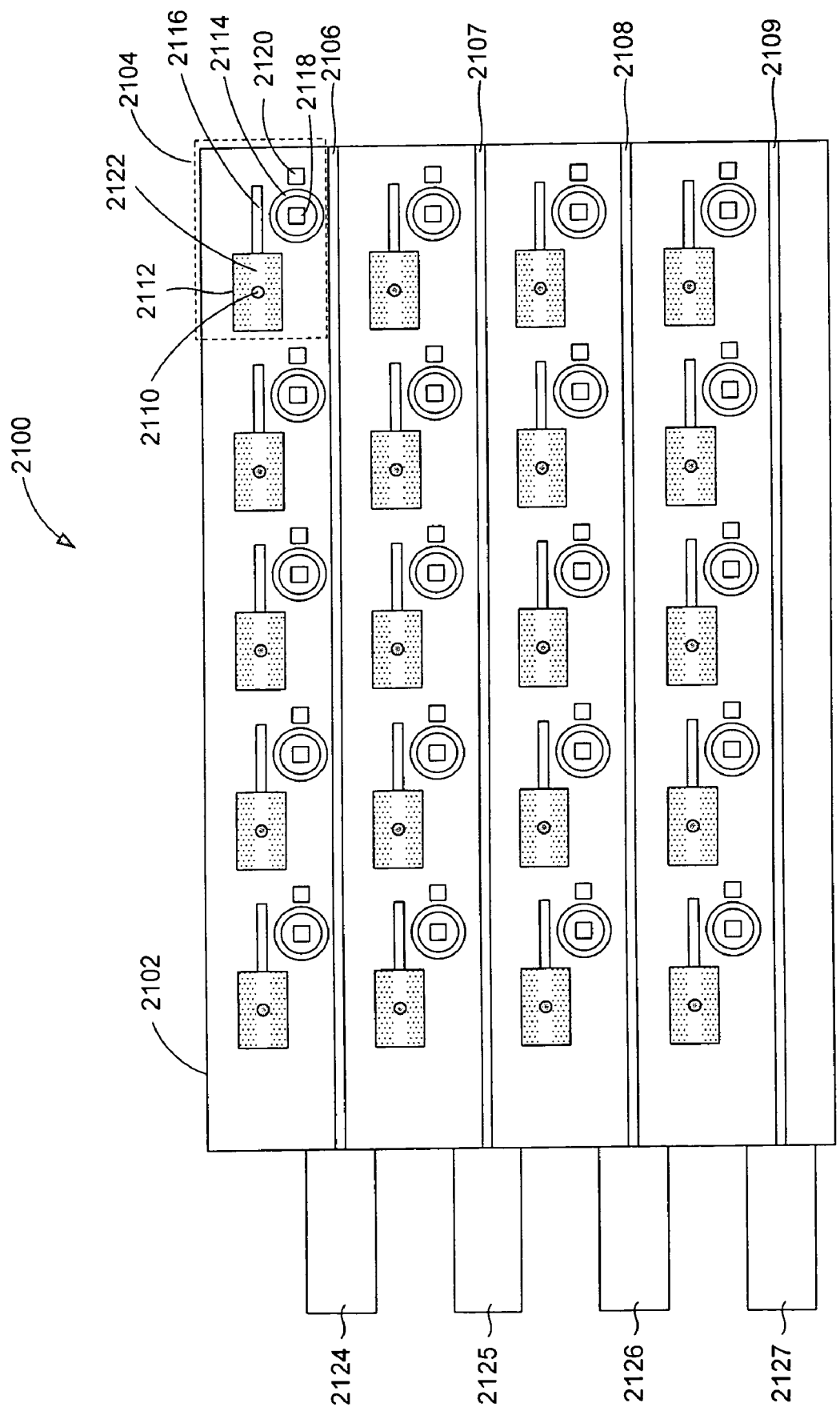

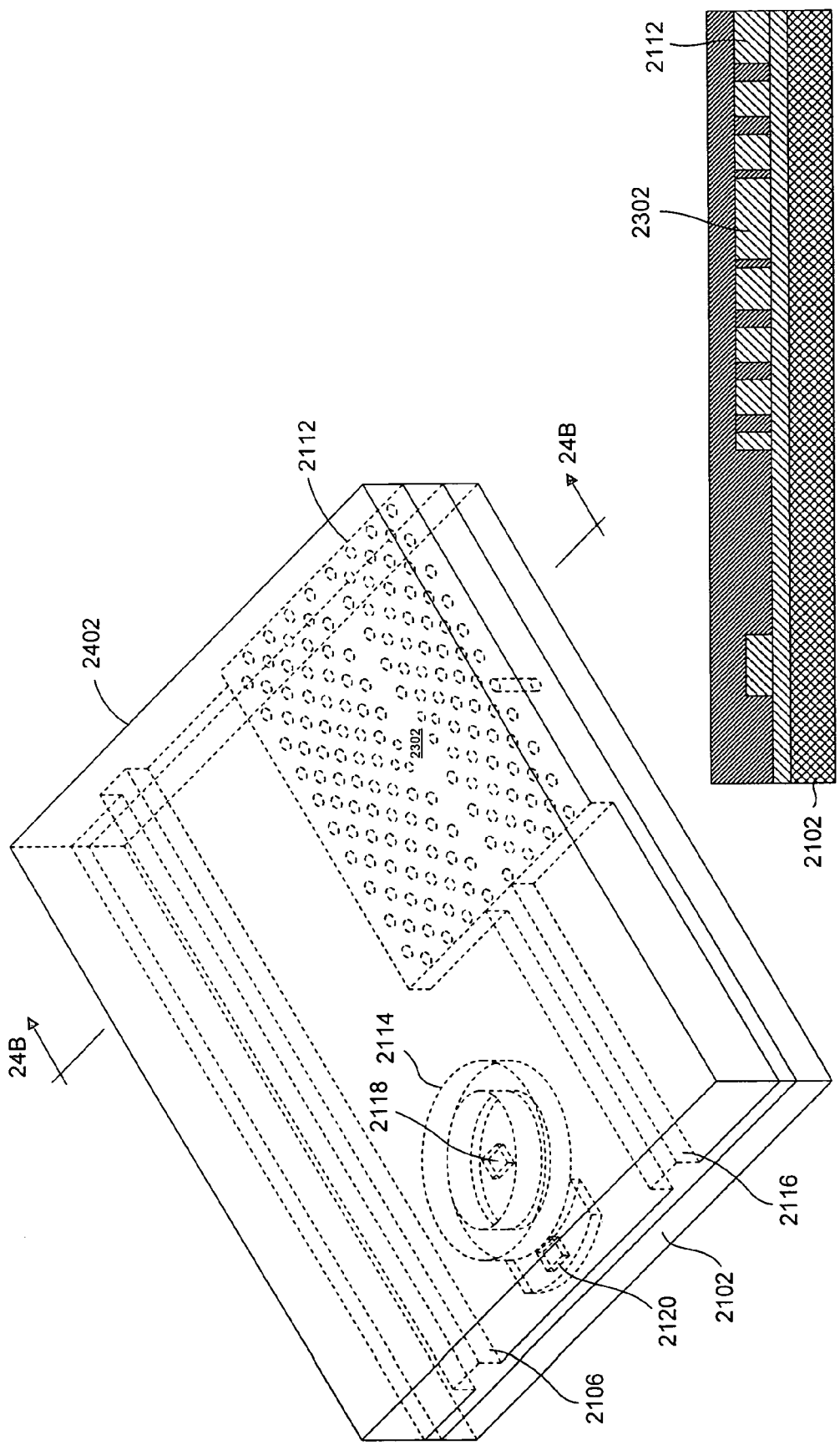

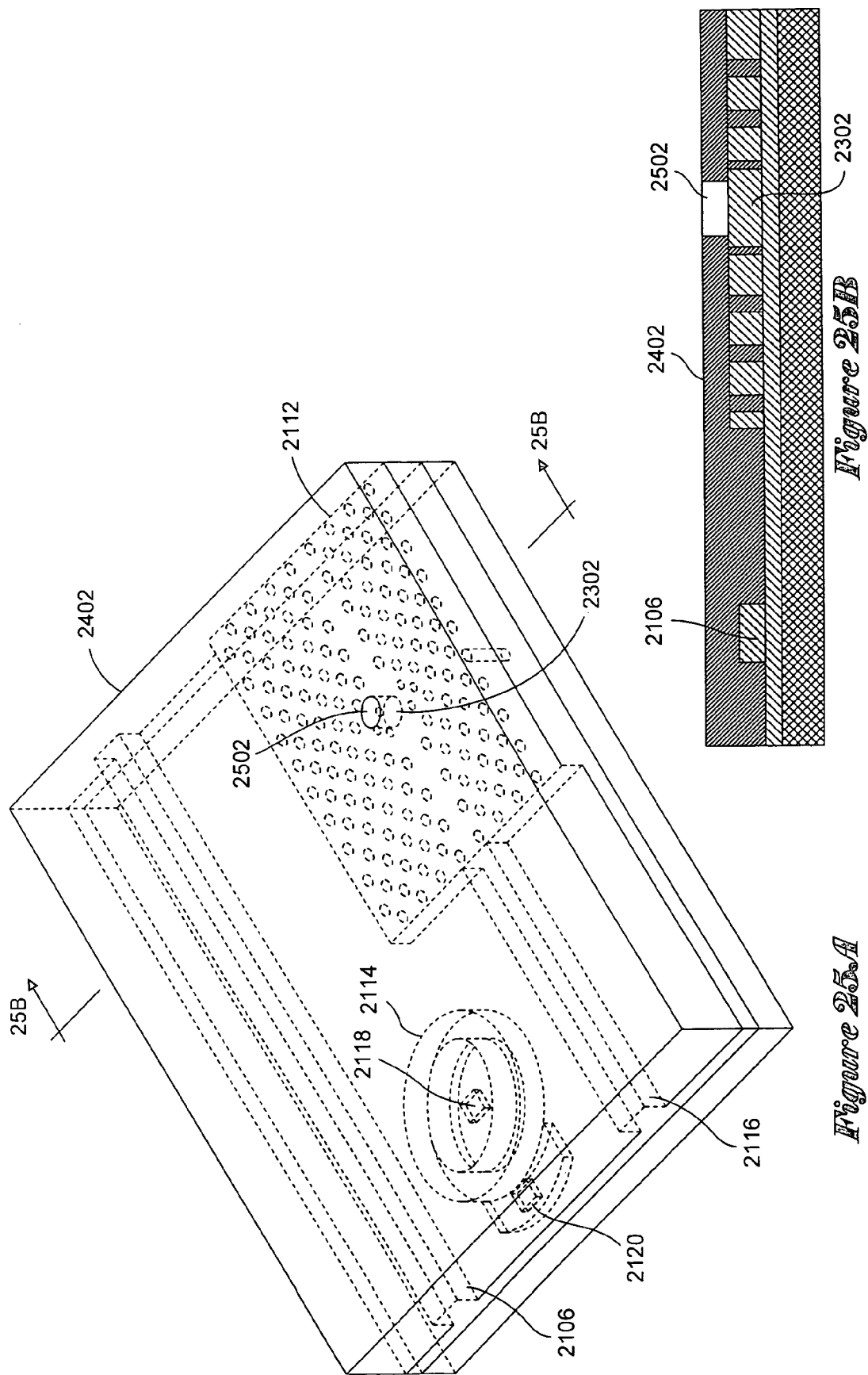

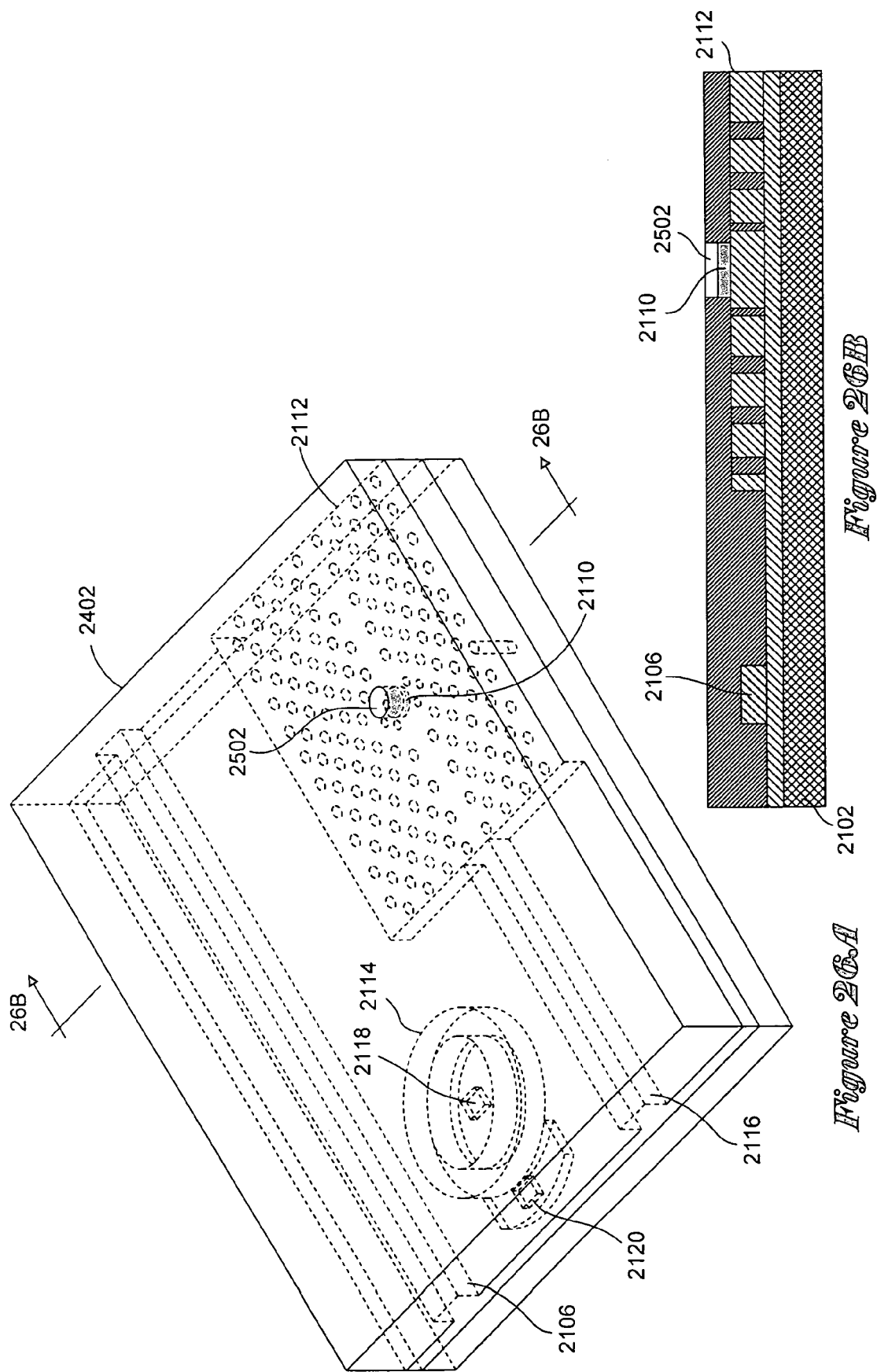

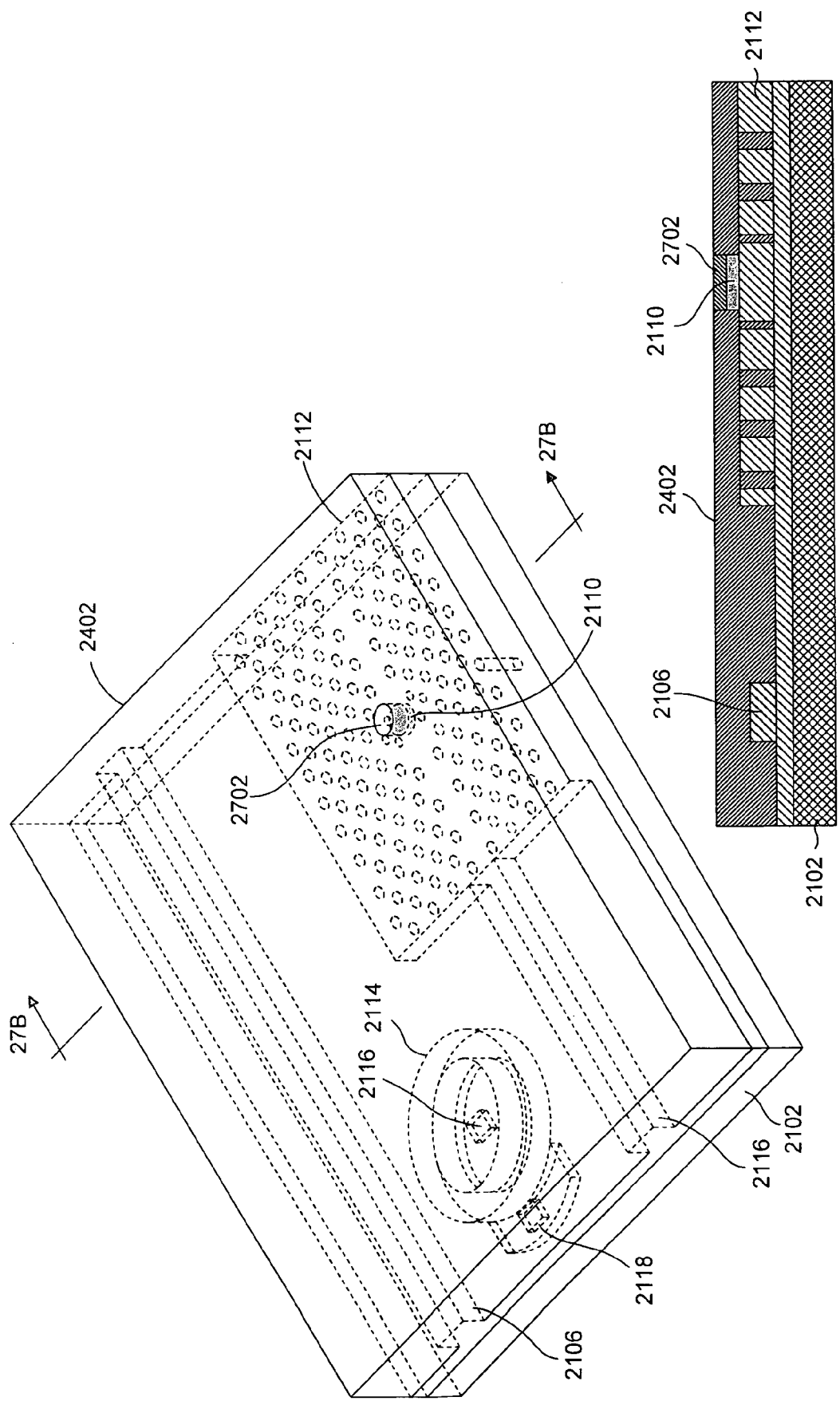

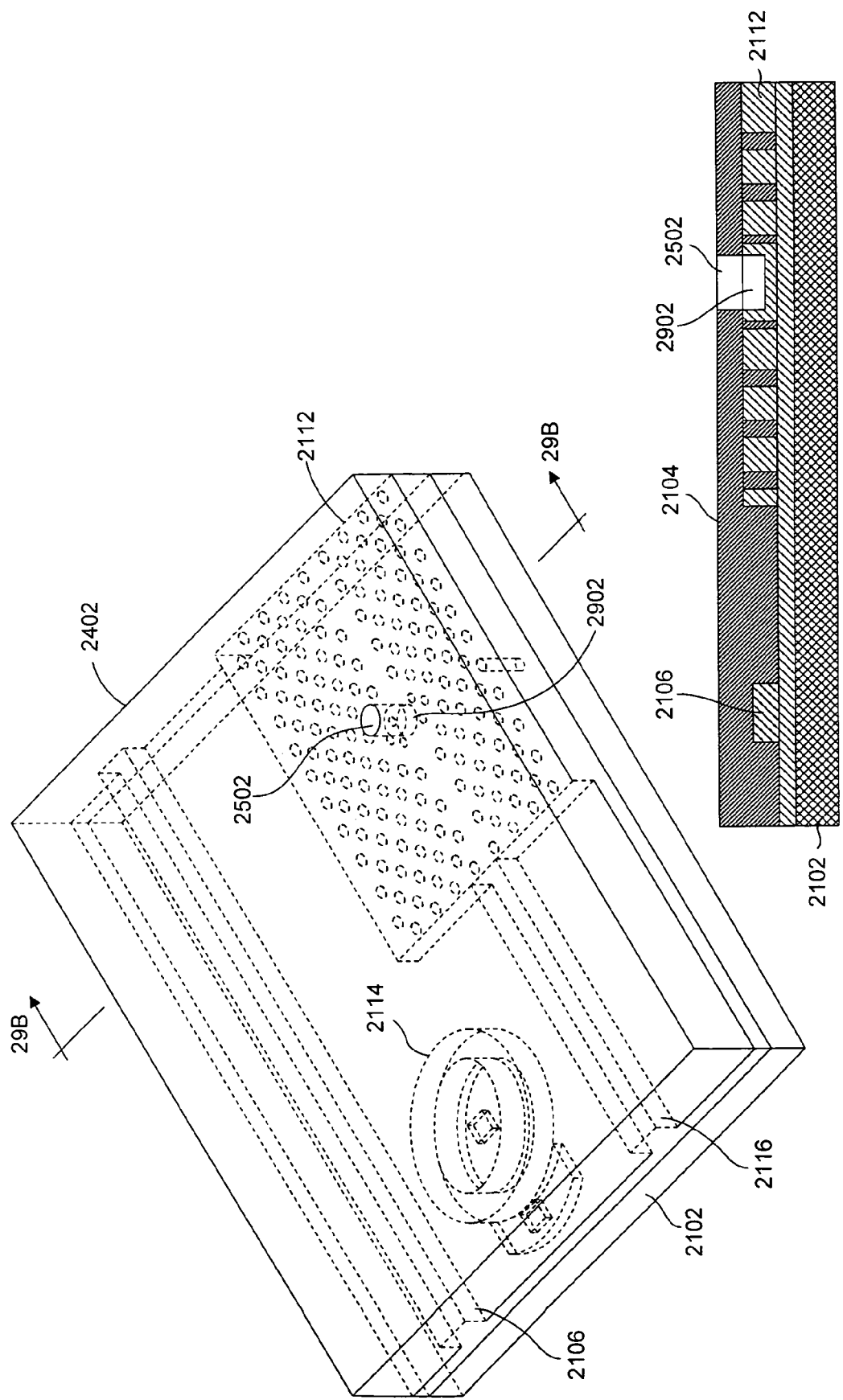

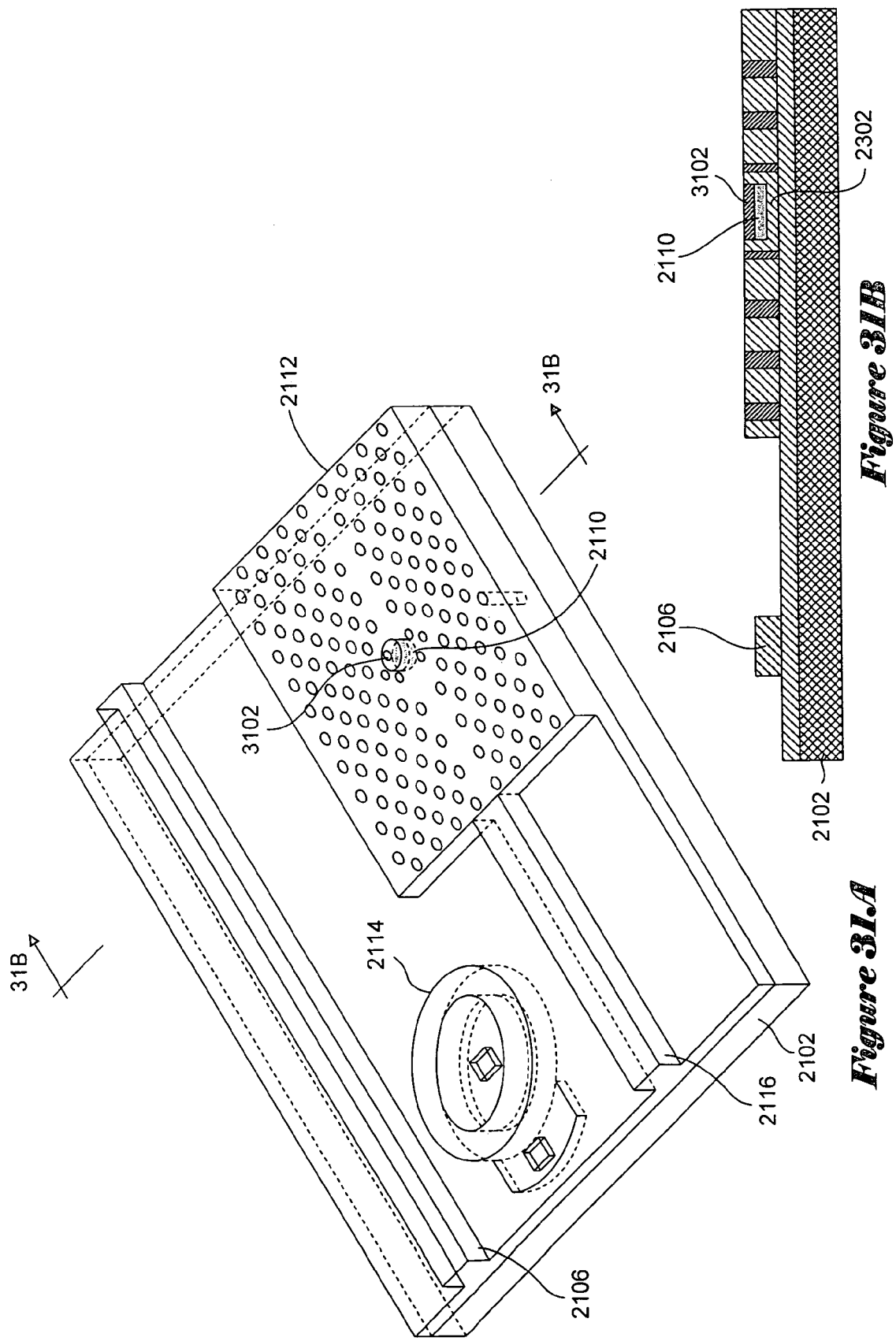

SCALABLE AND DEFECT-TOLERANT QUANTUM-DOT-BASED QUANTUM COMPUTER ARCHITECTURES AND METHODS FOR FABRICATING QUANTUM DOTS IN QUANTUM COMPUTER ARCHITECTURES

TECHNICAL FIELD

Systems and methods of the present invention relate to quantum computer architectures, and in particular, to quantum-dot-based quantum computer architectures that are both scalable and defect tolerant and to methods for fabricating quantum dots in quantum computer architectures.

BACKGROUND OF THE INVENTION

Advancements in disciplines ranging from atomic physics to various branches of condensed matter physics are being used to fabricate a variety of different materials for use in many different technological applications, such as computing systems and laser-based technologies, just to name a few. In particular, physicists, computer scientists, and engineers have recognized that fabricating networks that include quantum dots ("QDs") may provide promising and potentially useful systems for storing and processing quantum information.

A QD is a semiconductor crystal that, in general, comprises from about 10 to about 50 atoms and may range in diameter from about 2 to about 10 nanometers. A QD has a number of quantized electronic energy states, and only two electrons can occupy any one energy state. FIG. 1A illustrates an energy-level diagram 102 representing a number of quantized energy states of an ideal hypothetical QD. In energy-level diagram 102, each quantized energy state is represented by a horizontal line, and the quantum energy states are arranged vertically in order of increasing energy. The quantized energy states of a semiconductor include an inaccessible range of energies called an "electronic bandgap" 104. Electrons occupying energy states below the electronic bandgap 104 are said to be in a valance band 106, and electrons occupying energy states above the electronic bandgap 104 are said to be in a conduction band 108. As shown in FIG. 1A, the lowest possible electronic energy state of the QD occurs when pairs of electrons, each electron denoted by "e-," occupy the energy states in the valance band 106.

Applying an appropriate electronic stimulus 110, such as heat, voltage, or electromagnetic radiation, to a QD can change the electronic energy state of the QD. When the magnitude of the energy associated with the electronic stimulus is large enough, one or more electrons can be promoted into a higher energy state in the conduction band. For example, in FIG. 1A, an electron 112 that occupies an energy state in the valance band 106 absorbs the energy associated with an electronic stimulus by jumping into an energy state in the conduction band 108, which leaves a positively charged electron hole 114 in the valance band 106. Note that the minimum energy an electron in the valance band 106 needs to absorb in order to be promoted into an energy state in the conduction band 108 corresponds to the width of the electronic bandgap 104. The electron 112 remains momentarily in an energy state of the conduction band 108 before transitioning back across the electronic bandgap 104 to an energy state in the valance band 106. As the electron 112 transitions from an energy state in the conduction band 108 to an energy state in the valance band 106, electromagnetic radiation 116 corresponding to the energy lost in the transition is emitted. Typically, electrons transition from the lowest energy state of the conduction band to the highest energy state of the valance band. Because the electronic bandgap is fixed for a particular QD, each time this transition occurs electromagnetic radiation of a fixed wavelength is emitted.

The wavelength of the electromagnetic radiation emitted by a QD can, however, be adjusted by changing the number of atoms comprising the QD or changing the shape of the QD. FIG. 1B illustrates two different energy-level diagrams. In FIG. 1B, each energy-level diagram corresponds to a different hypothetical QD. Both of the QDs have identical chemical compositions, but each QD has a different number of atoms. Energy-level diagram 118 shows the quantized energy states of a first QD, and energy-level diagram 120 shows the quantized energy states of a second QD having the same chemical composition as the first QD but with a fewer number of atoms. Note that the energy separations between the quantized energy states and the electronic bandgap associated with the first QD are smaller than the energy separations between the quantized energy states and the electronic bandgap associated with the second QD. The wavelength of electromagnetic radiation emitted by the first QD is different from the wavelength of the electromagnetic radiation emitted by the second QD because of the energy difference in the electronic bandgaps. For example, the energy-level diagram 118 shows an energy-state transition 122 resulting in an emission of electromagnetic radiation with a wavelength $\lambda_1$, while the energy-level diagram 120 shows an energy-state transition 124 resulting in an emission of electromagnetic radiation with a wavelength $\lambda_2$, where $\lambda_2 < \lambda_1$.

QDs are potentially useful single photon sources and may be useful for storing quantum bits and processing quantum information. The QDs are typically formed on a substrate surface and resonant cavities are positioned or fabricated near the QDs. The resonant cavities are connected by a network of optical-based transmission channels called "waveguides." The quality of a resonant cavity can be assessed by calculating the Purcell factor:

$$F_{Purcell} = \frac{3}{4\pi^2}\left(\frac{\lambda}{n}\right)^3\left(\frac{Q}{V}\right)$$

where $\lambda$ is the wavelength of an electromagnetic wave trapped in the resonant cavity, n is the refractive index of the material comprising the resonant cavity, Q, called the "quality factor," is a measure of how many oscillations that take place within the resonant cavity before damping dissipates the original excitation, and V is the mode volume of the resonant cavity.

The larger the Purcell factor is for a resonant cavity, the better the resonant cavity is at trapping electromagnetic radiation. However, in order to maximize the Purcell factor associated with a resonant cavity in close proximity to a QD, the QD and resonant cavity modes need to be spatially and spectrally matched.

QD-based quantum networks are typically fabricated by first fabricating a random distribution of QDs on a substrate surface. Next, the QDs that satisfy wavelength emission requirements are identified as operational QDs, and a slab of dielectric material with resonant cavities is placed over the substrate. Each resonant cavity is placed in close proximity to each operational QD. Waveguides in the slab are used to transmit electromagnetic radiation to and from the operational QDs or to a bus. An example of fabricating randomly distributed QDs on a substrate surface is described in "Single-photon Generation with InAs Quantum Dots," by Charles Santori et al., *New Journal of Physics*, 6 (2004) 89. FIGS. 1C-1D illustrate fabrication of QDs embedded in pillar resonant cavities. In FIG. 1C, a semiconductor layer 126, comprising alternating layers of GaAs and AlAs, is deposited on the top surface of a substrate 128. The semiconductor layer 126 may include one or more layers of InAs, each layer of InAs embedded in a spacer layer of GaAs. Next, particles, such as particle 130, are randomly scattered over the top surface of the semiconductor layer 126. Each particle serves as a resist that shields a portion of the semiconductor layer 126 located directly below each particle during etching. Next, the semiconductor layer 126 is etched leaving pillars supported by the substrate 128. FIG. 1D illustrates pillars resulting from etching the semiconductor layer 126, in FIG. 1C. Each pillar corresponds to a portion of the semiconductor layer 126 shielded by a particle. For example, pillar 132 corresponds to a portion of the semiconductor layer 126 located beneath the particle 130, in FIG. 1C. FIG. 1E illustrates an enlargement of the pillar 132 shown in FIG. 1D. The pillar 132 comprises a top distributed-Bragg-reflector ("DBR") 134, a bottom DBR 136, and a single QD layer 138 of InAs embedded within a GaAs spacer layer 140. Both the top and bottom DBRs 134 and 136 comprise alternating layers of GaAs and AlAs. Each pillar serves as a three-dimensional resonant cavity, and each embedded QD of InAs serves as a single-photon emitter.

However, networks based on a random distribution of QDs are not typically defect tolerant. In other words, when a number of the QDs in the QD-based networks do not function properly or are poorly coupled to a quantum bus, the entire QD-based network may have to be discarded. For example, it may be determined that after a QD-based network has been fabricated that a number of the waveguide needed to couple particular QDs to a quantum bus are intersected by defective QDs that disrupts the transmission of electromagnetic radiation. The QD-based network has to be discarded and the fabrication process repeated until a random distribution of QDs produces a desired number of operational QDs that can be coupled to the bus. In addition, networks based on a random distribution of QDs are not typically scalable. In other words, the QD-based networks cannot typically be fabricated to support more computational demand by configuring the QD-based quantum networks with a larger number of processors, amount of memory, and amount of mass storage. Physicists, computer scientist, and engineers have recognized a need for scalable and defect tolerant QD-based networks and methods for fabricating quantum dots in these networks.

SUMMARY OF THE INVENTION

Various embodiments of the present invention are directed to quantum-dot-based quantum computer architectures that are scalable and defect tolerant and to methods for fabricating quantum dots in quantum computer architectures. In one embodiment of the present invention, a node of quantum computer architecture comprises a first photonic device supported by a substrate. The quantum computer architecture also includes a number of quantum dots coupled to the first photonic device, and a switch supported by the substrate that controls transmission of electromagnetic waves between a bus waveguide and the quantum dots.

BRIEF DESCRIPTION OF THE DRAWINGS

FIG. 8 illustrates a photonic band structure of transverse electric field and magnetic field modes propagating in the two-dimensional photonic crystal shown in FIG. 5.

FIG. 11 illustrates a quantum-dot-based chip that represents an embodiment of the present invention.

FIG. 12 illustrates a photonic chip that represents an embodiment of the present invention.

FIG. 20A illustrates a perspective view of a node with quantum dots located on a substrate surface near a microring that represents an embodiment of the present invention.

FIG. 21 illustrates a second quantum-dot-based photonic chip that represents an embodiment of the present invention.

FIG. 24A illustrates a perspective view of a barrier layer deposited on the photonic component shown in FIG. 23 that represents an embodiment of the present invention.

FIG. 24B illustrates a cross-sectional view of the photonic component shown in FIG. 24A that represents an embodiment of the present invention.

FIG. 25A illustrates a perspective view of a hole etched into the barrier layer of the photonic component shown in FIG. 24 that represents an embodiment of the present invention.

FIG. 25B illustrates a cross-sectional view of the photonic component shown in FIG. 25A that represent an embodiment of the present invention.

FIG. 26A illustrates a perspective view of quantum dots deposited on a resonant cavity of a photonic crystal shown in FIG. 25 that represents an embodiment of the present invention.

FIG. 26B illustrates a cross-sectional view of the photonic component shown in FIG. 26A that represents an embodiment of the present invention.

FIG. 27A illustrates a perspective view of the component shown in FIG. 26 after the hole in the barrier layer has been filled with capping material that represents an embodiment of the present invention.

FIG. 27B illustrates a cross-sectional view of the component shown in FIG. 27A that represents an embodiment of the present invention.

FIG. 29A illustrates a perspective view of the component shown in FIG. 25 with a second hole etched into a resonant cavity of a photonic crystal that represents an embodiment of the present invention.

FIG. 29B illustrates a cross-sectional view of the component shown in FIG. 29A that represents an embodiment of the present invention.

FIG. 31A illustrates a perspective view of the component shown in FIG. 30 after the barrier layer has been removed and capping material deposited in the hole above the quantum dots that represents an embodiment of the present invention.

FIG. 31B illustrates a cross-sectional view of the component shown in FIG. 31A that represents an embodiment of the present invention.

DETAILED DESCRIPTION OF THE INVENTION

Various embodiments of the present invention are directed to quantum-dot-based quantum computer architectures that are scalable and defect tolerant and to methods for fabricating quantum dots in quantum computer architectures. A quantum computer architecture includes a network of photonic devices supported by a substrate. A quantum computer architecture can be fabricated as a scalable and defect-tolerant photonic chip that can be used as a processor, memory array, or incorporated into a device that is used for quantum computing, quantum information processing, and storing quantum information. A photonic device can be a microdisk, microring, ridge waveguide, or a resonant cavity of a photonic crystal. For readers unfamiliar with photonic crystals, an overview of photonic crystals, waveguides, and resonant cavities is provided in a first subsection. Various system and method embodiments of the present invention are subsequently provided in a second subsection.

An Overview of Photonic Crystals, Waveguides, and Resonant Cavities

Figure 1A:
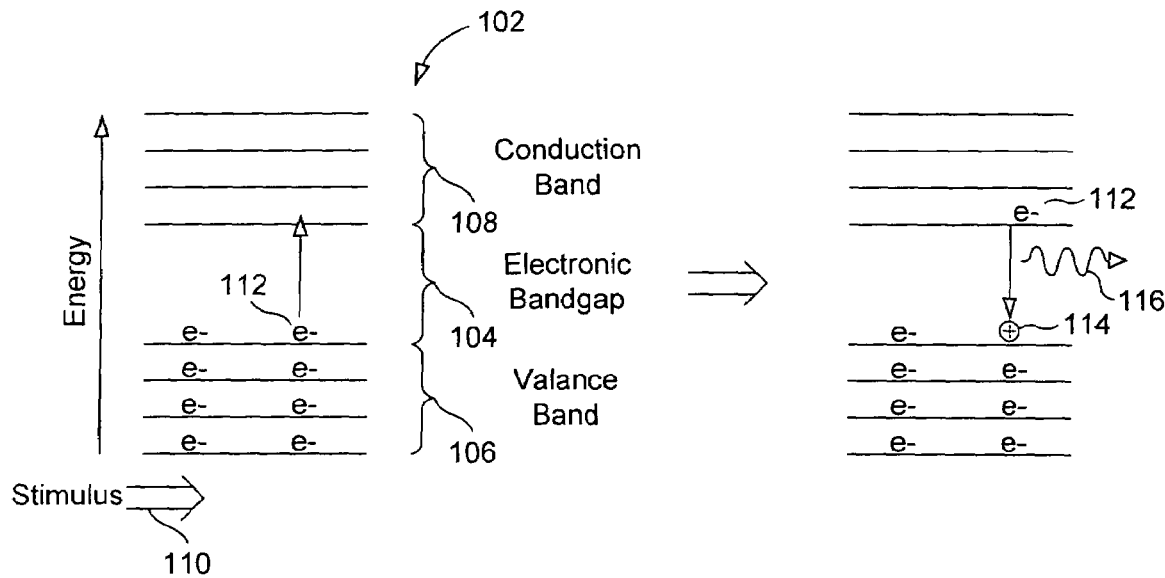
FIG. 1A illustrates an energy-level diagram representing quantized energy states of a quantum dot.
Figure 1B:
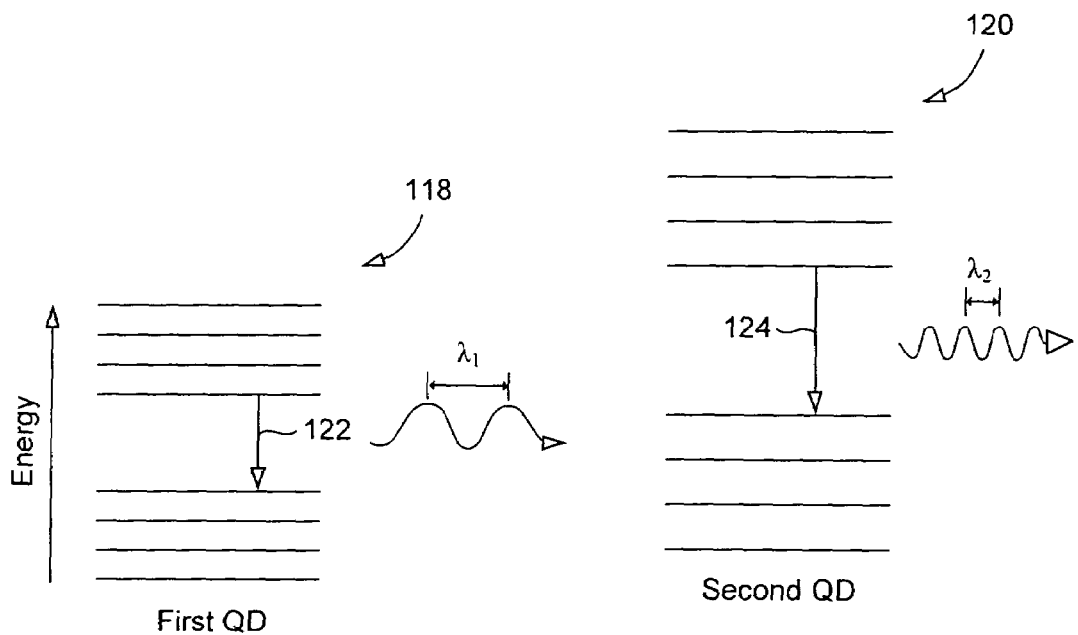
FIG. 1B illustrates two different energy-level diagrams for two quantum dots, both of which have identical chemical compositions but different numbers of atoms.
Figure 1C:
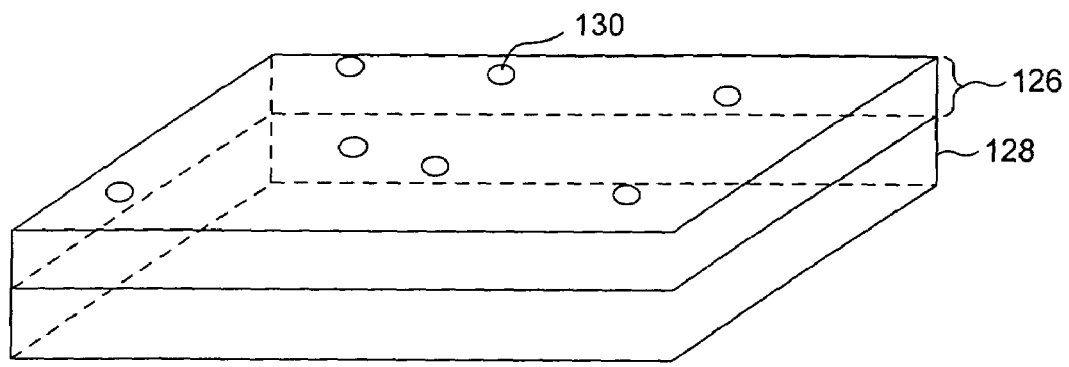
FIGS. 1C-1D illustrate fabrication of quantum dots embedded in pillar resonant cavities.
Figure 1D:
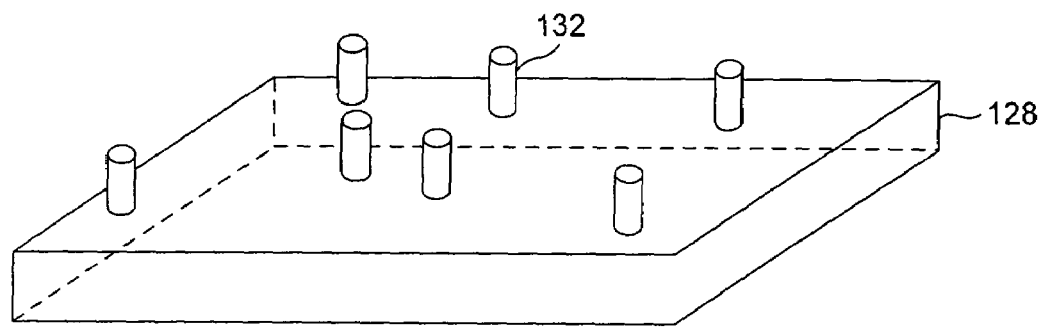
Figure 1E:
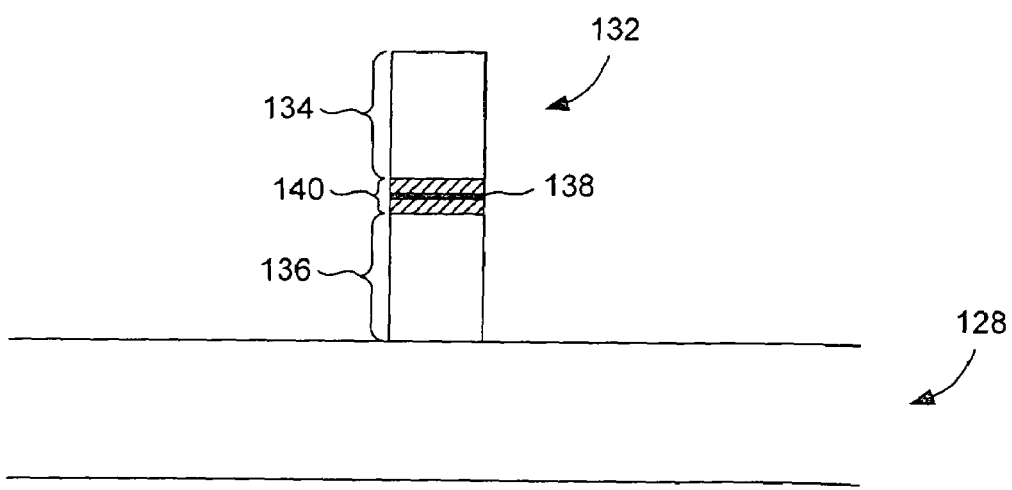
FIG. 1E illustrates an enlargement of a pillar resonant cavity.
Figure 2:
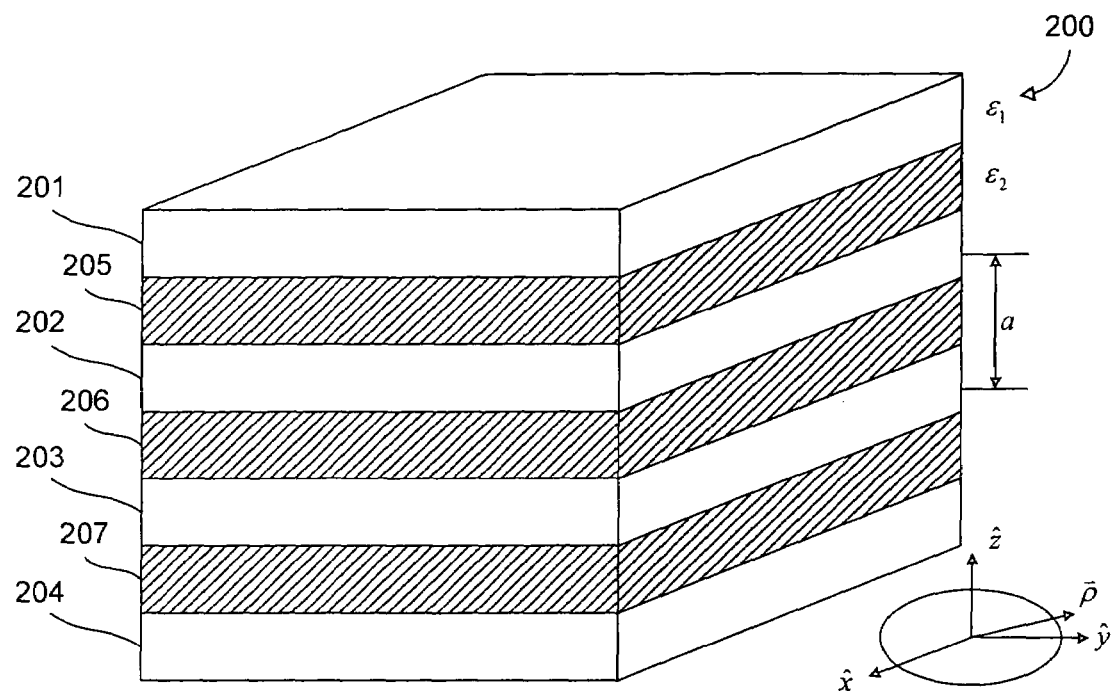
FIG. 2 illustrates an example of a one-dimensional photonic crystal.
Figure 3:
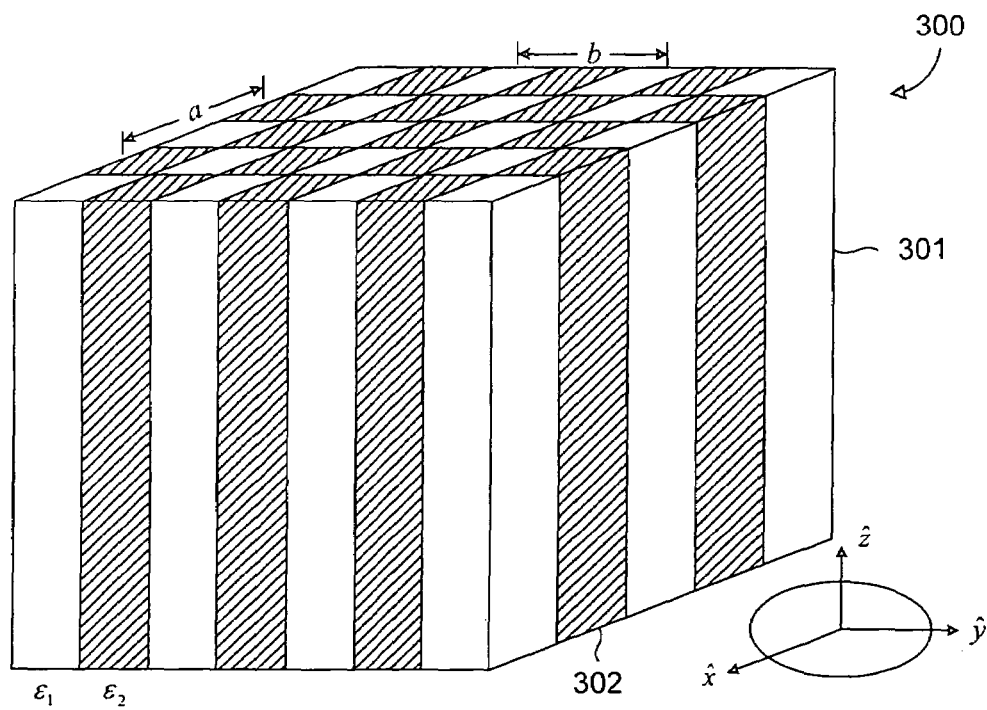
FIG. 3 illustrates an example of a two-dimensional photonic crystal.

Photonic crystals are photonic devices composed of two or more different materials with dielectric properties that, when combined together in a regular pattern, can modify the propagation characteristics of electromagnetic radiation ("ER"). FIGS. 2 and 3 illustrate two of many different possible patterns in which two different materials with different dielectric properties can be combined to form a photonic crystal. Photonic crystals are typically identified by the number of directions in which the dielectric pattern is periodic. For example, FIG. 2 illustrates an example of a one-dimensional photonic crystal. In FIG. 2, a photonic crystal 200 is composed of seven layers of two different dielectrics that alternate periodically in the z-direction. Unshaded layers 201-204 are composed of a first dielectric having a dielectric constant $\in_1$, and hash-marked layers 205-207 are composed of a second dielectric having a different dielectric constant $\in_2$. The layers are regularly spaced with a repeat distance called a "lattice constant," in the case of the lattice constant shown in FIG. 2, lattice constant a. FIG. 3 illustrates an example of a two-dimensional photonic crystal. The two-dimensional photonic crystal 300 comprises alternating layers of two different dielectrics, and is periodic in both the x-direction and the y-direction with two lattice constants a and b. Unshaded regions, such as region 301, are composed of a first dielectric having dielectric constant $\in_1$, and hash-marked regions, such as region 302, are composed of a second dielectric having a different dielectric constant $\in_2$. Photonic crystals can also be fabricated with repeating patterns in three dimensions. Three-dimensional photonic crystals can be fabricated using spheres, tubes, or other solid shapes comprising a first dielectric embedded in a slab comprising a second dielectric.

ER propagating in a dielectric can be characterized by electromagnetic waves comprising oscillating, orthogonal electric fields, $\vec{E}$, and magnetic fields, $\vec{H}$, and a direction of propagation, $\vec{k}$. The electric and magnetic fields are related by Maxwell's equations:

$$\nabla \cdot \vec{H}(\vec{r}, t) = 0 \qquad \text{Equation 1}$$

$$\nabla \cdot \varepsilon(\vec{r})\vec{E}(\vec{r}, t) = 0 \qquad \text{Equation 2}$$

$$\nabla \times \vec{E}(\vec{r}, t) = -\frac{\partial \vec{H}(\vec{r}, t)}{\partial t} \qquad \text{Equation 3}$$

$$\nabla \times \vec{H}(\vec{r}, t) = \varepsilon(\vec{r})\frac{\partial \vec{E}(\vec{r}, t)}{\partial t} \qquad \text{Equation 4}$$

where $\vec{r}$ is spatial displacement of an electromagnetic wave in the dielectric, t is time, and $\in(\vec{r})$ is a dielectric constant.

Because dielectrics do not generally support free charges or free currents, Equations 1-4 do not include a charge density term or a volume current density term. Equations 3 and 4, the curl equations, are linear differential equations. In both equations, the left sides express the dependence of a field on the independent spatial displacement $\vec{r}$, and the right sides express the dependence of a field on t. The only way for a differential quantity that varies with respect to $\vec{r}$ to remain equal to a quantity that varies with respect to t, is for the differential quantities to equal the same constant value. Both sides of Equations 3 and 4 are equal to a constant, and the method of separation of variables can be applied to obtain:

$$\vec{H}(\vec{r}, t) = \vec{H}(\vec{r})\exp(i\omega t)$$

$$\vec{E}(\vec{r}, t) = \vec{E}(\vec{r})\exp(i\omega t)$$

where ω is the angular frequency of an electromagnetic wave propagating in a dielectric.

Maxwell's curl Equations 3 and 4 can be decoupled by dividing Equation 4 by the dielectric constant $\in(\vec{r})$, applying the curl operator, and substituting Equation 3 for the curl of the electric field to give:

$$\Theta \vec{H}(\vec{r}) = \omega^2 \vec{H}(\vec{r}) \qquad \text{Equation 5}$$

where $$\Theta = \nabla \times \left(\frac{1}{\varepsilon(r)}\nabla \times\right) \text{ is a differential operator.}$$

Equation 5 is an eigenvalue equation, where the eigenvalues are $\omega^2$, and the eigenfunctions are the corresponding magnetic fields $\vec{H}(\vec{r})$. After the magnetic fields $\vec{H}(\vec{r})$ are determined according to Equation 5, the electric field $\vec{E}(\vec{r})$ can be obtained by substituting $\vec{H}(\vec{r},t)$ into Equation 3 and solving for $\vec{E}(\vec{r})$.

For finite dimensional photonic crystals, such as the photonic crystals shown in FIGS. 1 and 2, the eigenvalues and eigenfunctions of Equations 5 are quantized to give:

$$\Theta \vec{H}_j(\vec{r}) = \omega_j^2 \vec{H}_j(\vec{r})$$

where j is a non-negative integer value called the "band index" that labels the harmonic modes of the magnetic field $\vec{H}(\vec{r})$ in order of increasing angular frequency.

The translational symmetry of the photonic crystal can be used to determine the functional form of the magnetic fields $\vec{H}_j(\vec{r})$. For example, the functional form of the magnetic fields $\vec{H}_j(\vec{r})$ propagating in the photonic crystal 200 are given by the following:

$$\vec{H}_{j,k_{||},k_z}(\vec{r}) = \exp(i\vec{k}_{||}\cdot\vec{\rho})\exp(ik_z z)\vec{u}_{j,k_{||},k_z}(z) \qquad \text{Equation 6}$$

where $\vec{\rho}$ is an xy-plane vector, $\vec{k}_{||}$ is an xy-plane wave vector, $k_z$ is a z-direction wave vector component, and $\vec{u}_{n,k_{||},k_z}(z)$ is a periodic function in the z-direction. The exponential term $\exp(i\vec{k}_{||}\cdot\vec{\rho})$ in Equation 6 arises from the continuous translational symmetry of ER propagating through the dielectric layers in the xy-plane. However, the term $\exp(ik_z z)\vec{u}_{j,k_{||},k_z}(z)$ in Equation 6 arises from Bloch's theorem and the discrete translational symmetry imposed in the z-direction by the periodicity of the dielectric constant of the photonic crystal 200, given by:

$$\in(\vec{r}) = \in(\vec{r}+\vec{R})$$

where $\vec{R}=a l \hat{z}$, a is a lattice constant determined by the regular pattern of the dielectric layers, and l is an integer.

The magnetic fields $\vec{H}_{j,k_{||},k_z}(\vec{r})$ are periodic for integral multiples of 2π/a. As a result, the associated angular frequencies are also periodic:

$$\omega_j(k_z) = \omega_j\left(k_z + \frac{m 2\pi}{a}\right) \qquad \text{Equation 7}$$

Differences in the dielectric pattern of a photonic crystal creates one or more range of frequencies $\omega_j$, referred to as "photonic bandgaps," for which ER is prevented from propagating in the photonic crystal. The photonic bandgap also corresponds to an electromagnetic energy range and a range of wavelengths, denoted by $\lambda_j$, for which the differences between the dielectrics prevents ER absorption and ER propagation. The wavelength $\lambda_j$ of ER transmitted through a photonic crystal is related to the angular frequency $\omega_j$:

$$\lambda_j = \frac{2\pi v}{\omega_j}$$

where v is the velocity of ER in the photonic crystal. Certain ER frequency ranges are not transmitted through a photonic crystal because high-frequency harmonic modes tend to concentrate electromagnetic energy in dielectric regions with a low dielectric constant, while low-frequency harmonic modes tend to concentrate electromagnetic energy in dielectric regions with a high dielectric constant. The electromagnetic energy, W, can be determined from the variational principle as follows:

$$W(\vec{H}) = \frac{1}{2(\vec{H},\vec{H})} \int d\vec{r} \frac{1}{\varepsilon(\vec{r})} |\nabla \times \vec{H}(\vec{r})|^2$$

where $(\vec{H},\vec{H}) = \int d\vec{r}\, \vec{H}(\vec{r})^* \vec{H}(\vec{r})$, and "*" represents the complex conjugate.

The electromagnetic energy is lower for harmonic modes propagating in regions with a high dielectric constant than for modes propagating in regions of a photonic crystal with a low dielectric constant.

The size of and range of frequencies within a photonic bandgap of a one-dimensional photonic crystal depends on the relative difference between the dielectric constants of the dielectrics comprising a photonic crystal. One-dimensional photonic crystals with large relative differences between the dielectric constants of the materials comprising the photonic crystal have larger photonic bandgaps at higher frequency ranges than photonic crystals with smaller relative differences between the dielectric constants.

Figure 4A:
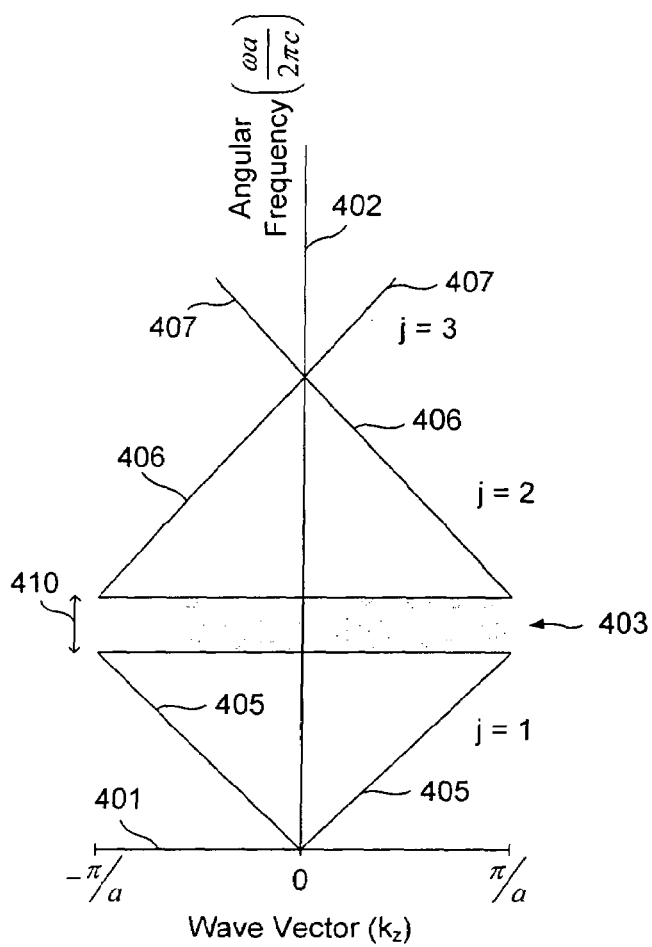
FIGS. 4A-4B are hypothetical plots of frequency versus wave vector z-component for a first one-dimensional photonic crystal and a second one-dimensional photonic crystal, respectively.
Figure 4B:
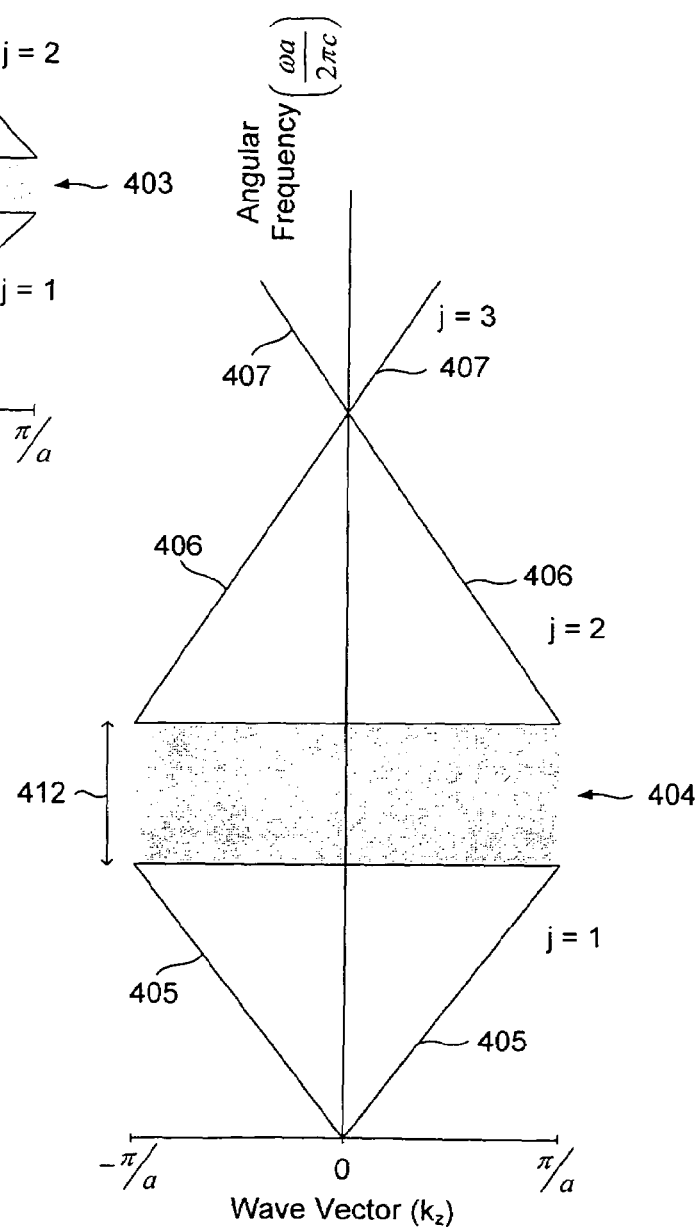

FIGS. 4A-4B are hypothetical plots of frequency ($\omega a/2\pi c$) versus wave vector z-component, $k_z$, for a first one-dimensional photonic crystal and a second one-dimensional photonic crystal, respectively. In FIGS. 4A-4B, horizontal axes, such as horizontal axis 401, correspond to wave vector z-component $k_z$, and vertical axes, such as vertical axis 402, correspond to the frequency. Because the frequencies $\omega_j$ are periodic, as described above with reference to Equation 7, frequencies ($\omega_j a/2\pi c$) are plotted with respect to wave vector z-component range $-\pi/a$ and $\pi/a$ for angular frequency bands j equal to 1, 2, and 3. The photonic bandgaps are identified by shaded regions 403 and 404. Lines 405, 406, and 407 correspond to the first, second, and third angular frequency bands (j=1, 2, and 3). The width 410 of the photonic bandgap 403, in FIG. 4A, is smaller than the width 412 of the photonic bandgap 404, in FIG. 4B, because the relative difference between the dielectric constants of the materials comprising the first photonic crystal is smaller than the relative difference between the dielectric constants of materials comprising the second photonic crystal. Also, the photonic bandgap 403 covers a lower range of frequencies than the range of frequencies covered by photonic bandgap 404.

Figure 5:
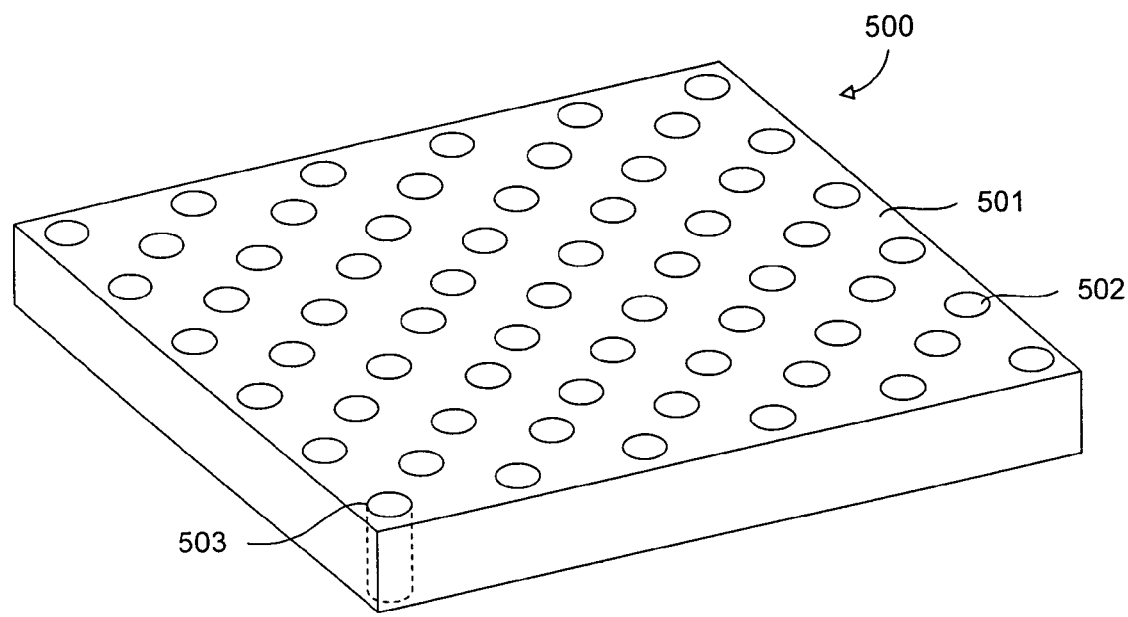
FIGS. 5-6 illustrate perspective views of two two-dimensional photonic crystals.
Figure 6:
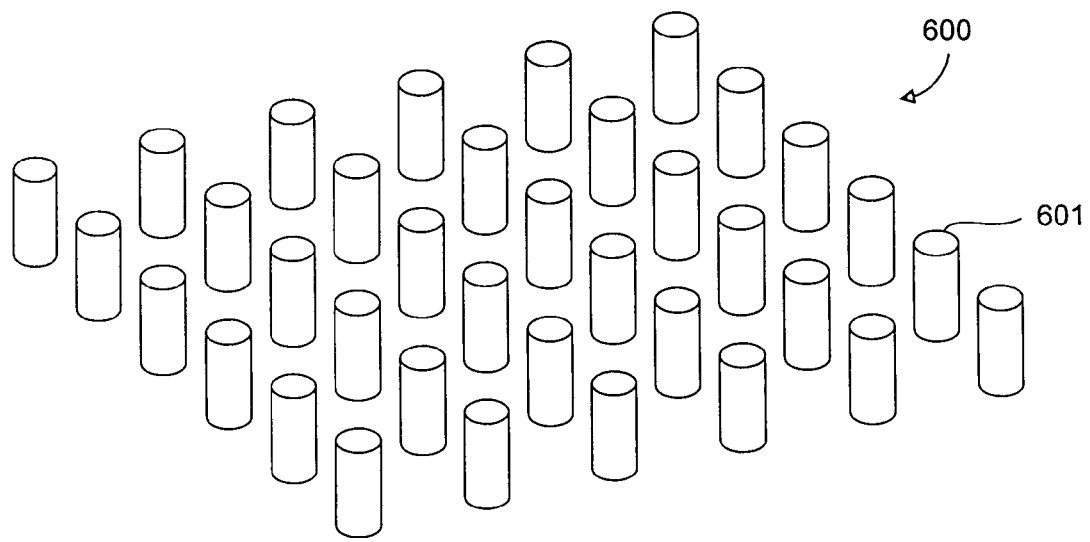

Two-dimensional photonic crystals can be composed of a regular lattice of cylindrical columns fabricated in a dielectric slab. The cylindrical columns can be air holes or holes filled with a dielectric material different from the dielectric material of the photonic slab. FIG. 5 illustrates a perspective view of a two-dimensional photonic crystal. In FIG. 5, a photonic crystal 500 is composed of a dielectric slab 501 with a regular lattice of embedded cylindrical columns, such as column 502. The cylindrical columns extend from the top surface to the bottom surface of the slab 501, as indicated by a cylindrical column 503, and can be holes filled with air or any other material having a dielectric constant different from the dielectric constant of the slab 501. Two-dimensional photonic crystals can also be composed of a regular lattice arrangement of cylindrical columns surrounded by a gas or a liquid. FIG. 6 illustrates a two-dimensional photonic crystal 600 having a regular square lattice of solid cylindrical columns, such as a cylindrical column 601, surrounded by fluid, such as gas or liquid, with a dielectric constant different from the cylindrical columns.

Figure 7A:
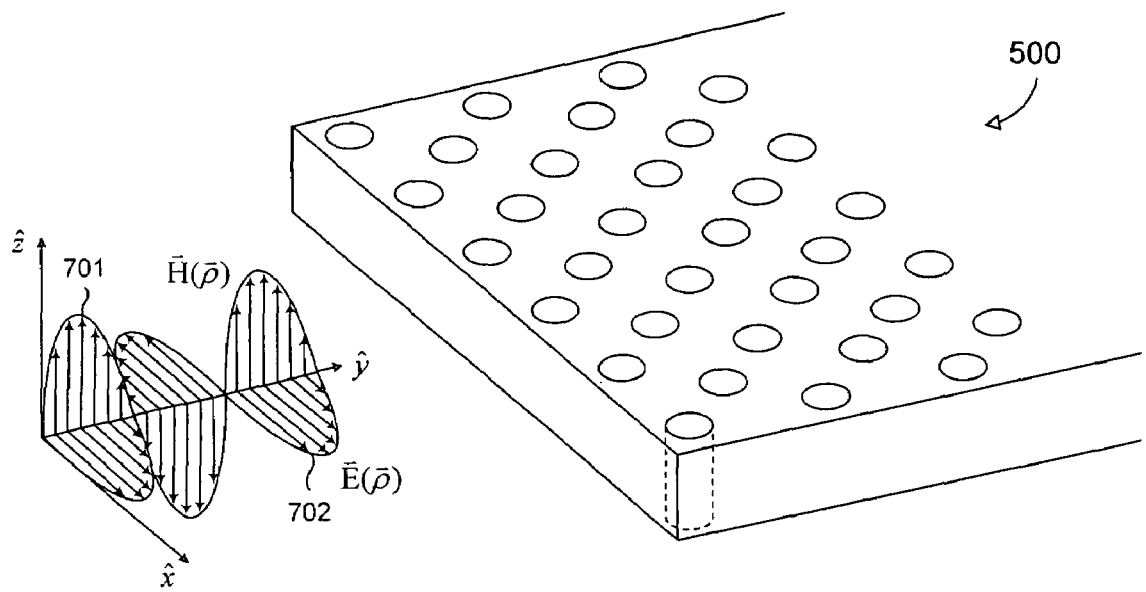
FIGS. 7A-7B illustrate propagation of a transverse electric field and magnetic field modes in the two-dimensional photonic crystal shown in FIG. 5.
Figure 7B:
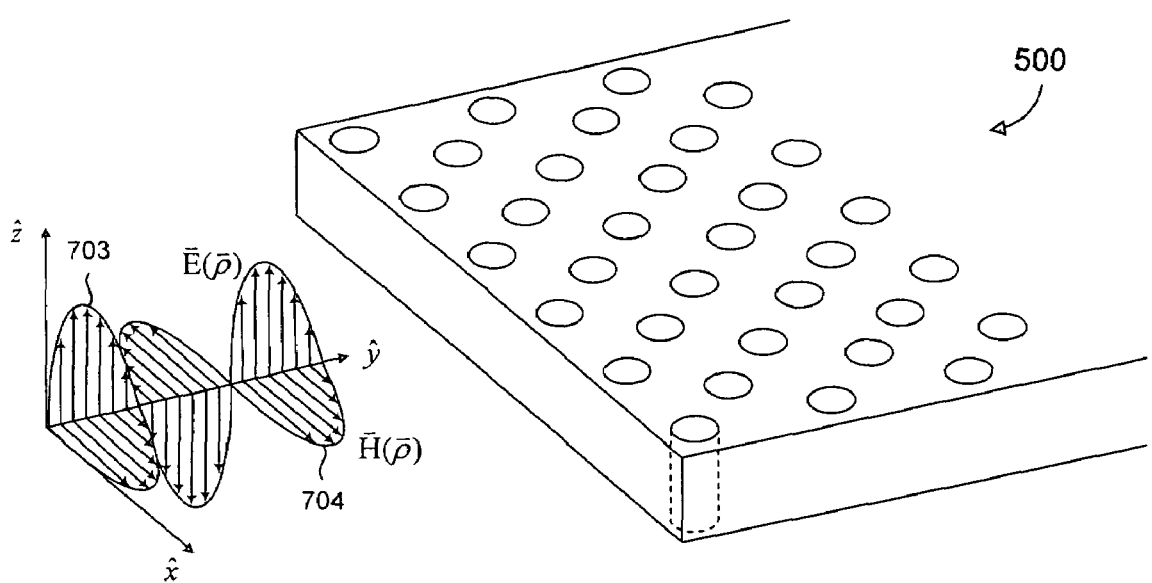

Two-dimensional photonic crystals polarize ER propagating in the periodic plane of the photonic crystal, and the electric and magnetic fields can be classified into two distinct polarizations: (1) the transverse electric-field ("TE") modes; and (2) the transverse magnetic-field ("TM") modes. The TE have $\vec{H}(\vec{\rho})$ directed normal to the periodic plane of the photonic crystal and $\vec{E}(\vec{\rho})$ directed in the periodic plane of the photonic crystal, while the TM have $\vec{E}(\vec{\rho})$ directed normal to the periodic plane of the photonic crystal and $\vec{H}(\vec{\rho})$ directed in the periodic plane of the photonic crystal. FIGS. 7A-7B illustrate propagation of TE and TM modes in the two-dimensional photonic crystal shown in FIG. 5. The periodic plane of the photonic crystal 500 lies in the xy-plane, the cylindrical columns are parallel to the z-direction, and ER propagates through the photonic crystal 500 in the y-direction. In FIG. 7A, an oscillating curve 701 represents the $\vec{H}(\vec{\rho})$ mode directed normal to the xy-plane, and an oscillating curve 702 represents the orthogonal $\vec{E}(\vec{\rho})$ mode directed in the xy-plane. In FIG. 7B, an oscillating curve 703 represents the $\vec{E}(\vec{\rho})$ mode directed normal to the xy-plane, and an oscillating curve 704 represents the orthogonal $\vec{H}(\vec{\rho})$ mode directed in the xy-plane.

FIG. 8 illustrates a photonic band structure of TM and TE modes of an ER propagating in the photonic crystal shown in FIG. 5. In FIG. 8, a vertical axis 801 represents the angular frequency of ER propagating in the photonic crystal 500, and a horizontal axis 802 represents the ER propagation paths between lattice points labeled Γ, M, and K in a photonic crystal segment 803 of the photonic crystal 500, shown in FIG. 5. Solid lines, such as solid line 804, represent TM modes, and dashed lines, such as dashed line 805, represent the TE modes. A shaded region 806 identifies a photonic bandgap in which neither the TE nor TM modes are permitted to propagate in the photonic crystal 500.

The width and the frequency range covered by photonic bandgaps in two-dimensional photonic crystal slabs, such as the photonic bandgap 806, depends on the periodic spacing of the cylindrical columns, represented by lattice constant a, and the relative difference between the dielectric constant of the slab and the dielectric constant of the cylindrical columns.

Also, the frequency range covered by photonic bandgap 806 can be shifted to a higher frequency range for larger relative differences between the dielectric constant of the slab and the dielectric constant of the cylindrical columns, while the photonic bandgap 806 can be shifted to a lower frequency range for smaller relative differences between the dielectric constant of the slab and the dielectric constant of the cylindrical columns.

Two-dimensional photonic crystals can be designed to reflect ER within a specified frequency band. As a result, a two-dimensional photonic crystal can be designed and fabricated as a frequency-band stop filter to prevent the propagation of ER having frequencies within the photonic bandgap of the photonic crystal. Generally, the size and relative spacing of cylindrical columns control which wavelengths of ER are prohibited from propagating in the two-dimensional photonic crystal. However, defects can be introduced into the lattice of cylindrical columns to produce particular localized components. In particular, a point defect, also referred to as a "resonant cavity," can be fabricated to provide a resonator that temporarily traps a narrow range of frequencies or wavelengths of ER. A line defect, also referred to as a "waveguide," can be fabricated to transmit ER with frequency ranges or wavelengths that lie within a frequency range of a photonic bandgap. As a result, a three-dimensional photonic crystal slab can be thought of as two-dimensional crystal having a refractive index n that depends on the thickness of the slab.

Figure 9:
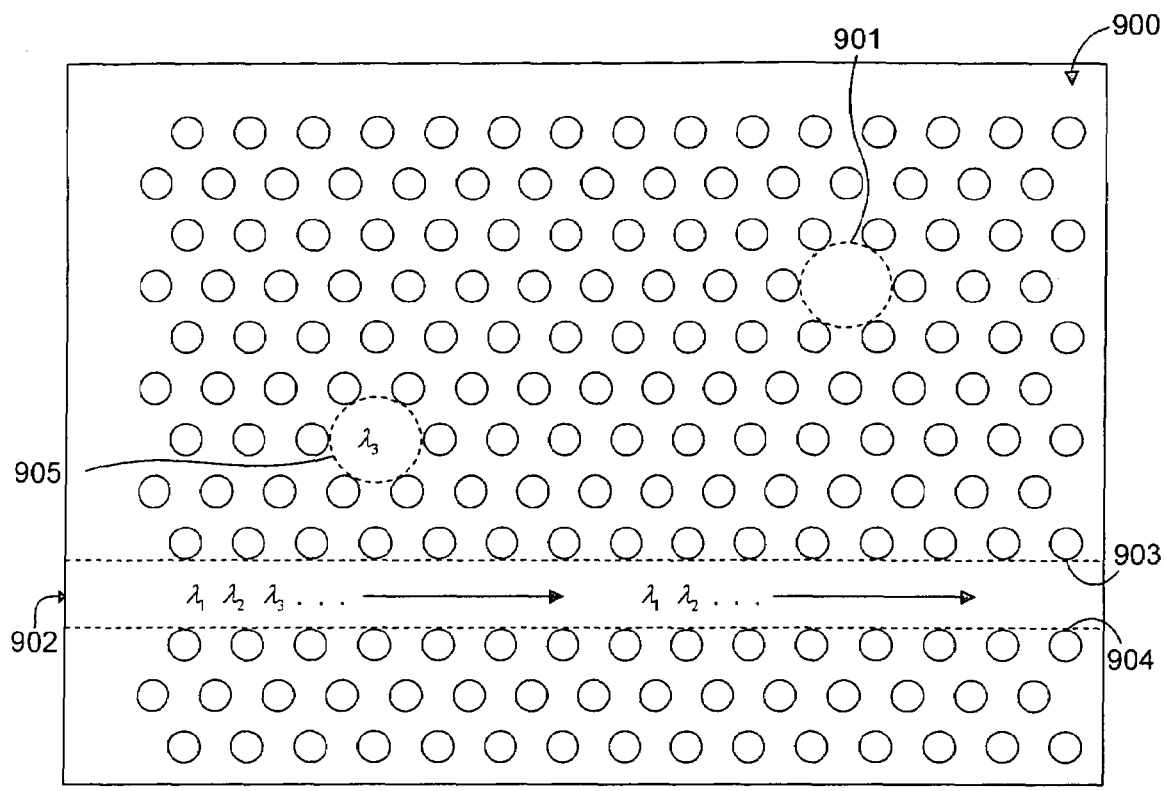
FIG. 9 illustrates an example of a photonic crystal with two resonant cavities and a waveguide.

FIG. 9 illustrates an example of a photonic crystal with two resonant cavities and a waveguide. A resonant cavity can be created in a two-dimensional photonic crystal slab by omitting, increasing, or decreasing the size of a select cylindrical column. For example, a resonant cavity 901 is created in a photonic crystal 900 by omitting a cylindrical column, as indicated by the empty region surrounded by a dashed-line circle. Resonant cavities 901 and 905 are surrounded by effectively reflecting walls that temporarily trap ER in the frequency range of the photonic bandgap. Resonant cavities can channel ER within a narrow frequency band in a direction perpendicular to the plane of the photonic crystal. For example, the resonant cavity 901 can trap localized TM modes and TE modes within a narrow frequency band of the photonic bandgap. Unless the photonic crystal 900 is sandwiched between two reflective plates or dielectrics that create total internal reflection, the ER resonating in the resonant cavity 901 can escape in the direction perpendicular to the periodic plane of the photonic crystal 900. Each resonant cavity has an associated quality ("Q") factor that provides a measure of how many oscillations take place in a cavity before the ER leaks into the region surrounding the resonant cavity.

Waveguides are optical transmission paths that can be used to direct ER within a particular frequency range of the photonic bandgap from a first location in a photonic crystal to a second location in the photonic crystal. Waveguides can be fabricated by changing the diameter of certain cylindrical columns within a column or row of cylindrical columns, or by omitting rows of cylindrical columns. For example, in the photonic crystal 900, a dielectric waveguide 902 is created by omitting an entire row of cylindrical columns during fabrication of the photonic crystal 900, as indicated by the empty region between dashed lines 903 and 904. The dielectric waveguide 902 transmits ER with wavelengths $\lambda_0$ and $\lambda_1$ along a single path. Networks of branching waveguides can be used to direct ER in numerous different pathways through the photonic crystal. The diameter of an optical signal propagating along a waveguide can be as small as $\lambda/3n$, where n is the refractive index of the waveguide, while a harmonic mode volume of a resonant cavity can be as small as $2\lambda/3n$.

Waveguides and resonant cavities may be less than 100% effective in preventing ER from escaping into the area immediately surrounding the waveguides and resonant cavities. For example, ER within a frequency range in the photonic bandgap propagating along a waveguide also tends to diffuse into the region surrounding the waveguide. ER entering the area surrounding a waveguide or a resonant cavity experiences an exponential decay in amplitude, a process called "evanescence." As a result, a resonant cavity can be located within a short distance of a waveguide to allow certain wavelengths of ER carried by the waveguide to be extracted by the resonant cavity. In effect, resonant cavities are filters that can be used to extract a fraction of a certain wavelength of ER propagating in the waveguide. Depending on a resonant cavity Q factor, an extracted ER can remain trapped in a resonant cavity and resonate for a time before leaking into the surroundings or backscattering into the waveguide. For example, in FIG. 9, the resonant cavity 901 is located too far from the waveguide 902 to extract a mode with particular wavelength of ER. However, the resonant cavity 905 is able to extract a fraction of ER with wavelength $\lambda_3$ propagating along the waveguide 902. Thus, a smaller fraction of ER with wavelength $\lambda_3$ may be left to propagate in the waveguide 902 along with ER of wavelengths $\lambda_1$ and $\lambda_2$.

Figure 10:
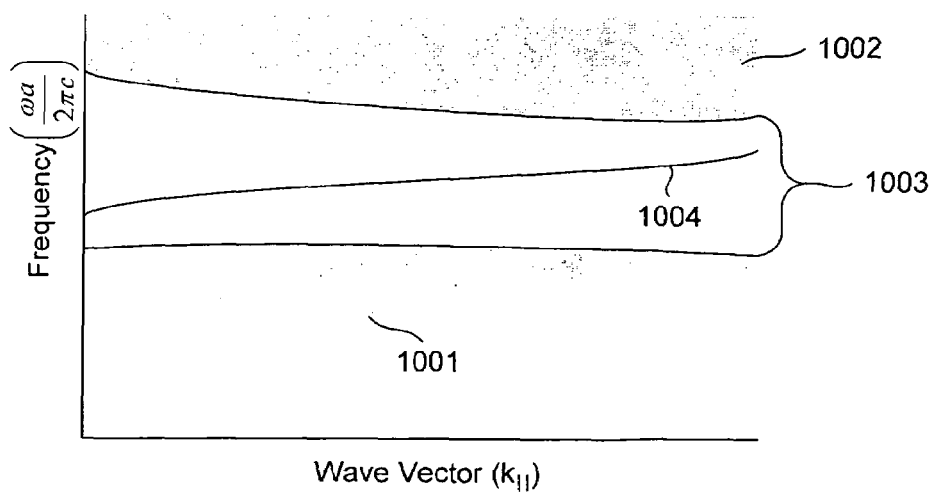
FIG. 10 is a hypothetical plot of frequency versus wave vector for the waveguide of the photonic crystal shown in FIG. 9.

FIG. 10 is a hypothetical plot of frequency versus the magnitude of wave vector $\vec{k}_{\parallel}$ for the waveguide of the photonic crystal shown in FIG. 9. In FIG. 10, shaded regions 1001 and 1002 represent projected first and second band structures of the photonic crystal 900 in the absence of the waveguide 902, shown in FIG. 9. A region 1003 identifies the photonic bandgap created by the photonic crystal 900. Line 1004 identifies a band of frequencies permitted to propagate in the waveguide 902. The number of frequency bands permitted to propagate in waveguide 902 can be increased by increasing the size of the waveguide 902.

For three-dimensional photonic crystals, the three-dimensional lattice parameters, the difference between dielectric constants, and the dimensions of the inclusions determine the frequency range of photonic bandgaps. Waveguides and resonant cavities can also be fabricated in three-dimensional photonic crystals by selectively removing or changing the dimensions of certain inclusions.

EMBODIMENTS OF THE PRESENT INVENTION

FIG. 11 illustrates a first QD-based photonic chip 1100 that represents an embodiment of the present invention. The photonic chip 1100 is an example of a quantum computer architecture that comprises a quantum network of 28 identically configured nodes, such as node 1104, and 4 bus waveguides 1106-1109 that are located on the top surface of a substrate 1102. The photonic chip 1100 can be operated as a processor, memory array, or any other device for quantum computing, quantum information processing, and storing quantum information. The node 1104 comprises a first microring 1110 coupled to a number of QDs that are represented by a shaded disk 1112, a second microring 1114 that is coupled to a first electrode 1116 and a second electrode 1118. Each of the QDs can be used to store a quantum bit of information. The waveguides 1106-1109 transmit information encoded in electromagnetic waves to and from the nodes and are separately coupled to optical fiber input/output couplers 1120-1123, respectively. Electrical signal lines (not shown) are in electrical contact with the electrodes. The signal lines can extend perpendicular to the substrate 1102 surface and transmit current to each electrode.

The bus waveguides 1106-1109 and the microrings are comprised of either a II-IV semiconductor or a III-V semiconductor, where the Roman numerals II, III, IV, and V refer to the Group Two, Group Three, Group Four, and Group Five elements in the Periodic Table of Elements, respectively. For example, the dielectric material comprising the microrings and the bus waveguides of the photonic chip 1100 can be a III-V semiconductor, such as GaAs, which comprises equal quantities of Ga, a Group Three element, and As, a Group Five element. The II-IV and the III-V semiconductors are not limited to just one Group Two element and one Group Four element, or one Group Three element and one Group Five element. The semiconductors can have a quantity of two or more different Group Two elements and an equal quantity of two or more different Group Four elements, or a quantity of two or more different Group Three elements and an equal quantity of two or more different Group Five elements. For example, the microrings and the bus waveguides can be comprised of a III-V semiconductor comprising a quantity of Al and Ga, both Group Three elements, and an equal quantity of P, a Group Five element. The II-IV semiconductor and III-V semiconductor materials used to fabricate the microrings and bus waveguides have a relatively higher index of refraction than the dielectric material comprising the substrate 1102. As a result, the substrate 1102 serves as a lower cladding layer for electromagnetic waves resonating in the microrings and electromagnetic waves transmitted in the bus waveguides 1106-1109.

At each node, an electromagnetic wave can be transmitted between a bus waveguide and the two microrings via evanescent coupling. For example, an electromagnetic wave transmitted along the bus waveguide 1106 can be transmitted by evanescent coupling to the second microring 1114. The electromagnetic wave resonates in the second microring 1114 and can again be transmitted by evanescent coupling to the first microring 1110. When the energy of the electromagnetic wave resonating in the first microring 1110 is greater than the electronic bandgap of the QDs 1112, the QDs 1112 may absorb the electromagnetic wave energy by promoting electrons from electronic energy states in the valance band to electronic energy states in the conduction band. When the QDs 1112 undergo electronic transitions from electronic energy states in the conduction band to electronic energy states in the valance band, an electromagnetic wave is emitted by the QDs 1112 and transmitted to the first microring 1110. Evanescent coupling transmits the electromagnetic wave from the first microring 1110 to the bus waveguide 1106 via the second microring 1114.

The dimensions of the microrings of each node can be different and/or be patterned with holes of different arrangements and sizes so that the first and second microrings can maintain resonance of an electromagnetic wave of a particular wavelength. The second microring of each node can serve as drop filter by extracting an electromagnetic wave of a particular wavelength out of numerous electromagnetic waves transmitted in an adjacent bus waveguide, and the second microring can also serve as an add filter by placing an electromagnetic wave of a particular wavelength in the adjacent bus waveguide.

The second microring and the first and second electrodes of each node comprise a switch that can be used to turn a node "on" or "off" by controlling the transmission of an electromagnetic wave of a particular wavelength between a bus waveguide and QDs located on a first microring. For example, in FIG. 11, the second microring 1114, the first electrode 1116, and the second electrode 1118 comprise a switch. An appropriate positive or negative voltage applied between the first electrode 1116 and the second electrode 1118 changes the refractive index of the second microring 1114. By changing the refractive index of the second microring 1114, the microring resonance frequency is shifted away from the emission frequency of the QDs 1112. As a result, the QDs 1112 and the bus waveguide 1106 are no longer coupled.

One embodiment of the methods for depositing QDs in the photonic chip 1100 is described below with reference to FIGS. 12-18. FIG. 12 illustrates a chip 1200 that represents an embodiment of the present invention. The chip 1200 comprises the same configuration of photonic devices described above with reference to the photonic chip 1100, in FIG. 11, except the chip 1200 does not include the QDs. Specifically, the chip 1200 comprises 28 photonic components, such as photonic component 1202, and the 4 bus ridge wave guides 1106-1109 located on the top surface of the substrate 1102. The chip 1200 can be fabricated by first depositing a II-IV semiconductor layer, or a III-V semiconductor layer, onto the substrate 1102 via a number of different processes, such as chemical vapor deposition ("CVD"), molecular beam epitaxy ("MBE"), and bonding a thin II-IV, or III-V, semiconductor film onto the substrate 1102. Next, the photonic devices, such as the microrings and waveguides, can be patterned into the semiconductor layer using various well-know ion etching, lithographic etching, and/or nanoimprint lithographic processes. For example, method embodiments of the present invention may employ one or more well-known ion etching processes, such as reactive ion etching, focused ion beam etching, and chemically assisted ion-beam etching, in order to pattern the photonic devices into the semiconductor layer. Methods of the present invention may also employ well-known photolithographic and/or electron beam ("e-beam") lithographic processes in order to pattern the photonic devices in the semiconductor layer. The photonic devices can also be fabricated on the nanoscale using nanoimprint lithography. Nanoimprint lithography involves first defining a master template of a pattern of microrings and waveguides that is transferred into the II-IV, or III-V, semiconductor layer deposited on the top surface of the substrate 1102.

Figure 13A:
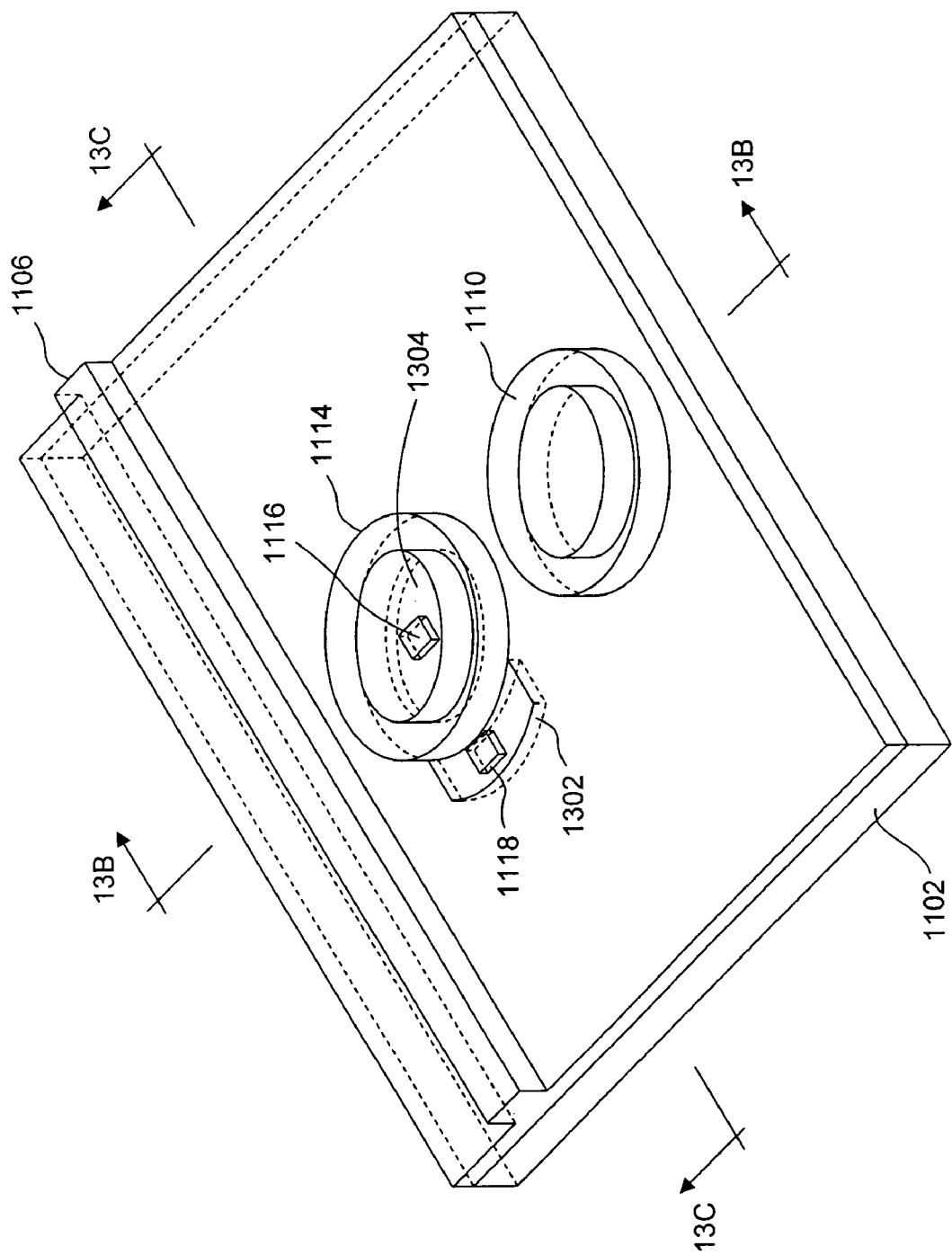
FIG. 13A illustrates a perspective view of a photonic component of the quantum-dot-based photonic chip shown in FIG. 12 that represents an embodiment of the present invention.

FIG. 13A illustrates a perspective view of the photonic component 1202 and a portion of the bus waveguide 1106 after the chip 1200 has been fabricated that represents an embodiment of the present invention. The second microring 1114 is located between the bus waveguide 1106 and the first microring 1110. The photonic component also includes a negatively-doped region ("n-region") 1302 and a positively doped region ("p-region") 1304. The n-region 1304 and the p-region 1306 are defined in the II-IV, or III-V, semiconductor material layers. The first electrode 1116 is located in the opening of the second microring 1114 on the top surface of the p-region 1304, and the second electrode 1118 is located on the top surface of the n-region 1302 outside the second microring 1114. The p-region 1304 and the n-region 1302 are separated by intrinsic semiconductor material to form a "p-i-n junction." The p-region 1304 can be created by implanting the electron hole donating atoms, such as B, into the semiconductor layer and the n-region 1302 can be created by implanting electron donating atoms, such as P, into the semiconductor layer.

Figure 13B:
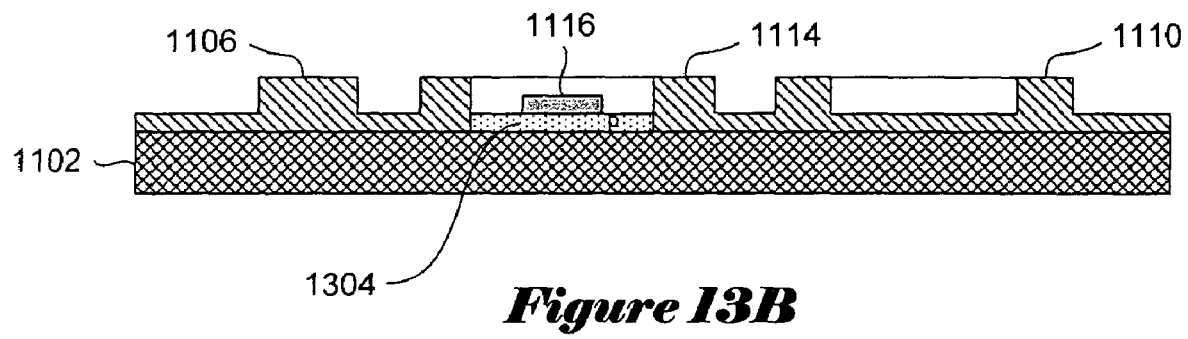
FIG. 13B illustrates a first cross-sectional view of the photonic component shown in the FIG. 13A that represents an embodiment of the present invention.
Figure 13C:
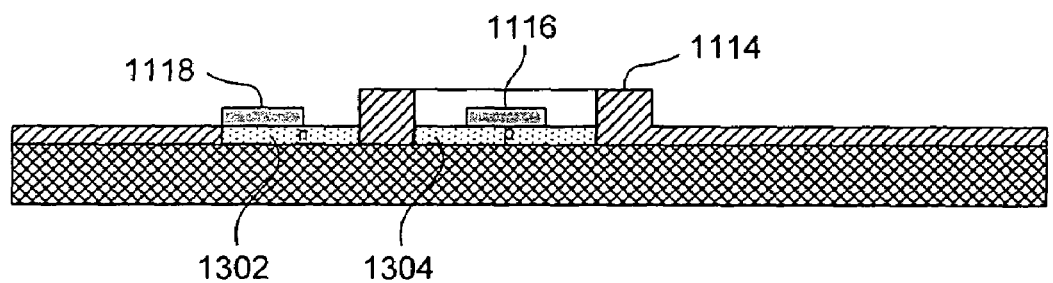
FIG. 13C illustrates a second cross-sectional view of the photonic component shown in the FIG. 13A that represents an embodiment of the present invention.

FIG. 13B illustrates a first cross-sectional view of the photonic component 1202 that represents an embodiment of the present invention. As shown in FIG. 13B, the second microring 1114 is located between the bus waveguide 1106 and the first microring 1110. The electrode 1116 rests on top of the p-region 1304,. FIG. 13C illustrates a second cross-sectional view of the photonic component 1202 that represents an embodiment of the present invention. In FIG. 13C, electrode 1118 rests on top of the n-region 1302.

Note that the present invention is not limited to locating the p-junctions within the microrings and locating the n-regions outside the microrings. In alternate embodiments of the present invention, the location of the n- and p-regions can be switched so that the n-regions are located within the openings of the microrings and the p-regions are located outside the microrings.

Figure 14A:
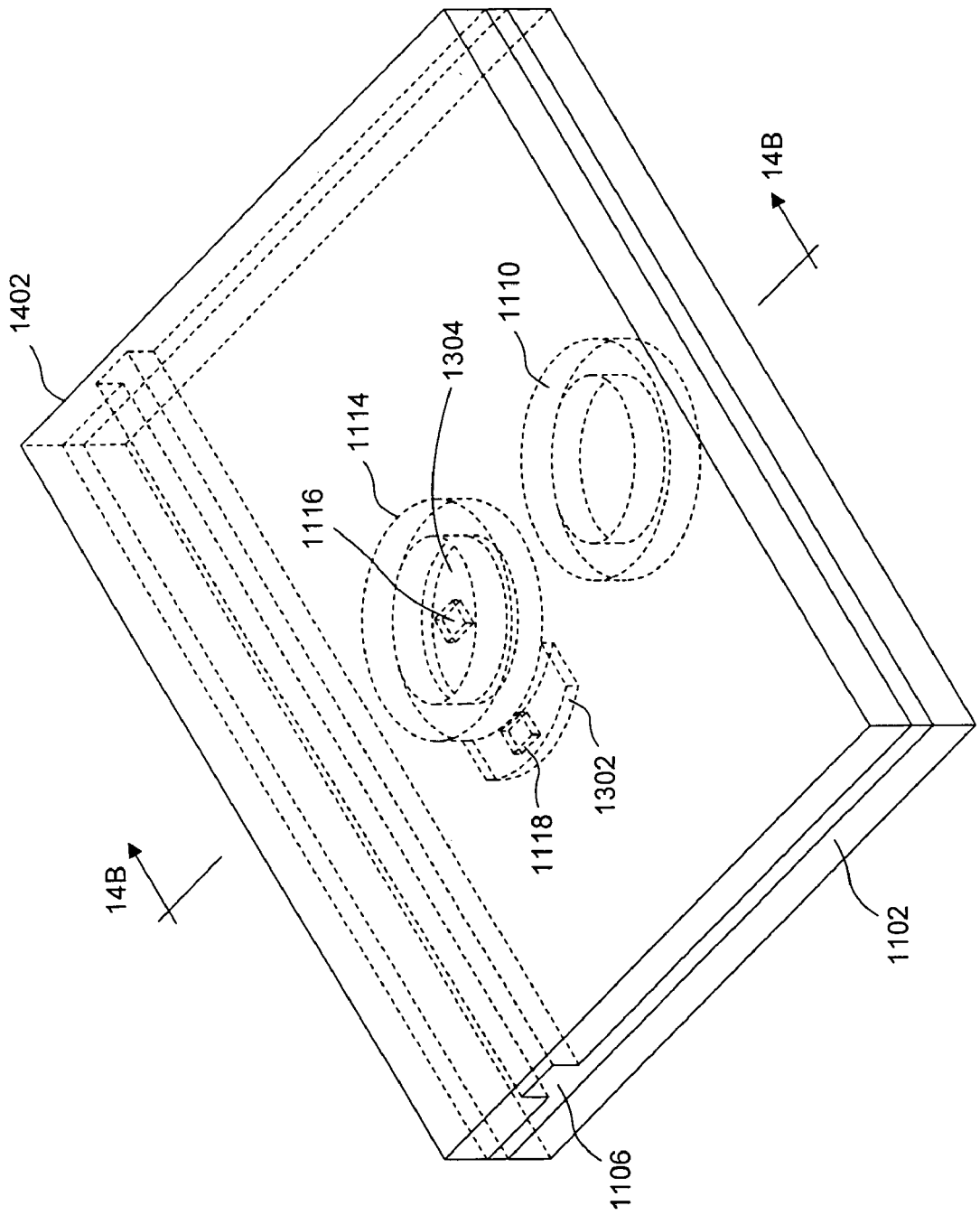
FIG. 14A illustrates a perspective view of a barrier layer deposited on a photonic component of the photonic chip shown in FIG. 12 that represents an embodiment of the present invention.
Figure 14B:
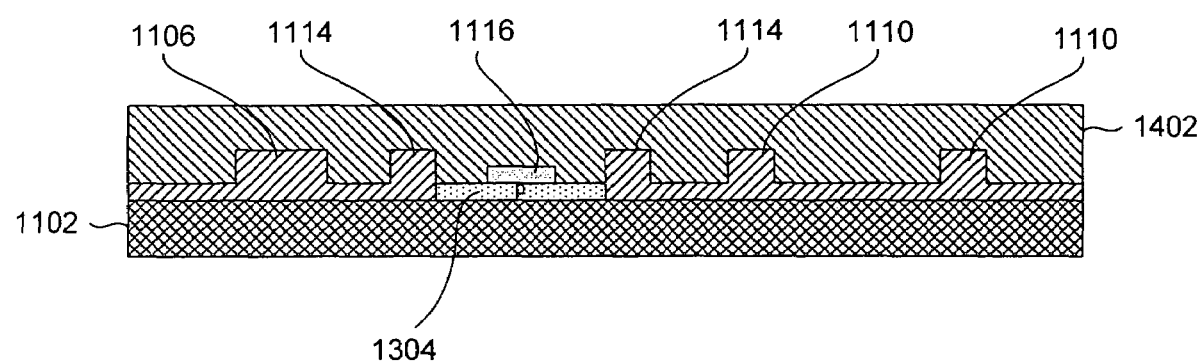
FIG. 14B illustrates a cross-sectional view of the photonic component shown in FIG. 14A that represents an embodiment of the present invention.

After the chip 1200 has been fabricated, as described above with reference to FIGS. 12 and 13, a barrier layer is deposited over the top surface of the chip 1200. FIG. 14A illustrates a perspective view of a barrier layer 1402 deposited on the component 1202 that represents an embodiment of the present invention. FIG. 14B illustrates a cross-sectional view of the barrier layer 1402 deposited on the photonic component 1202 that represents an embodiment of the present invention. The barrier layer covers the photonic devices and a portion of the adjacent bus waveguide 1106. The barrier layer 1402 can serve as an upper cladding layer because the barrier layer 1402 has a lower refractive index than the refractive index of the microrings 1110 and 1114 and the bus waveguide 1106. For example, the refractive index of the microrings 1110 and 1114 and the bus waveguide 1106 can be more than twice the refractive index of the barrier layer 1402.

Figure 15A:
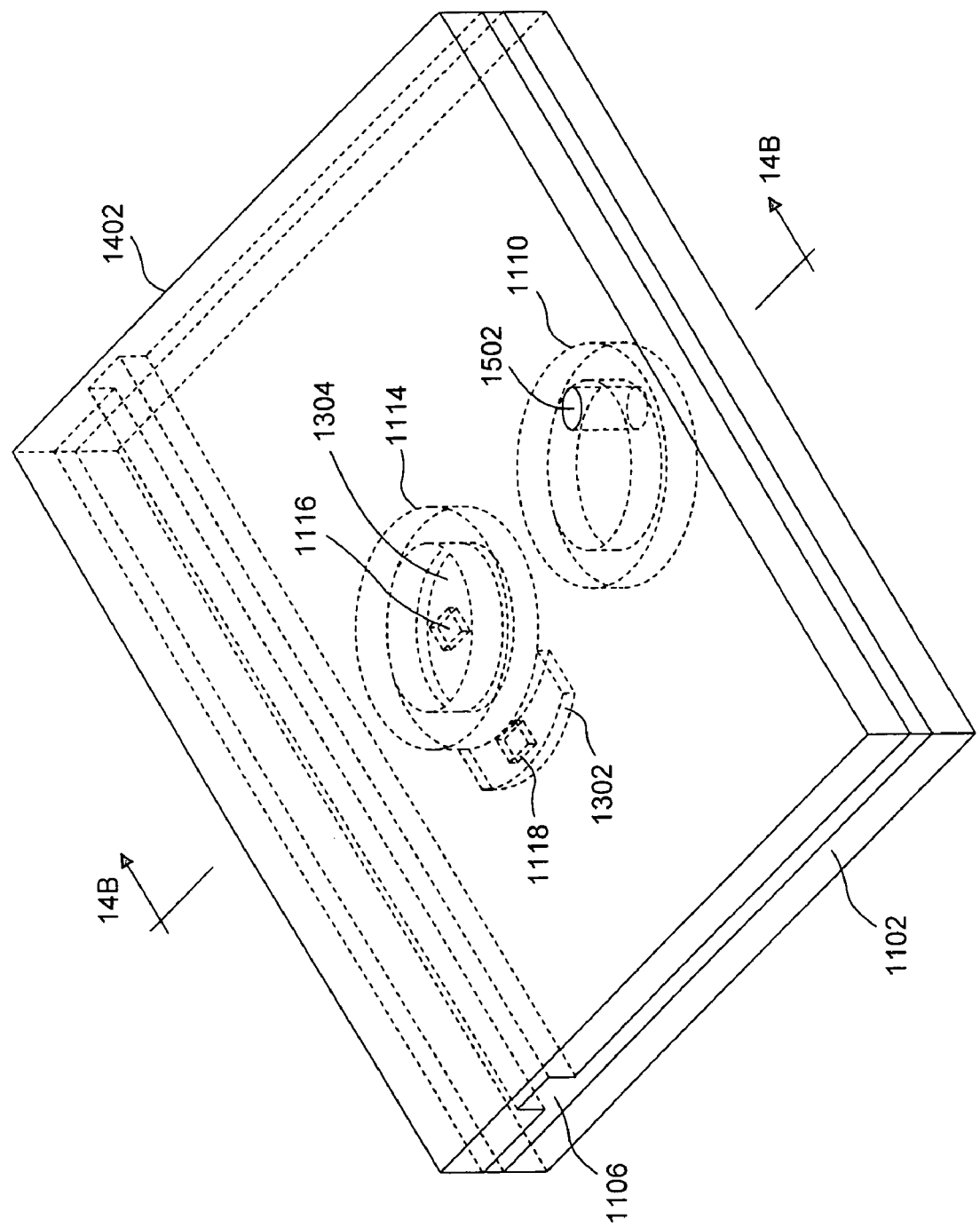
FIG. 15A illustrates a perspective view of a hole etched into the barrier layer of the photonic component shown in FIG. 14 that represents an embodiment of the present invention.
Figure 15B:
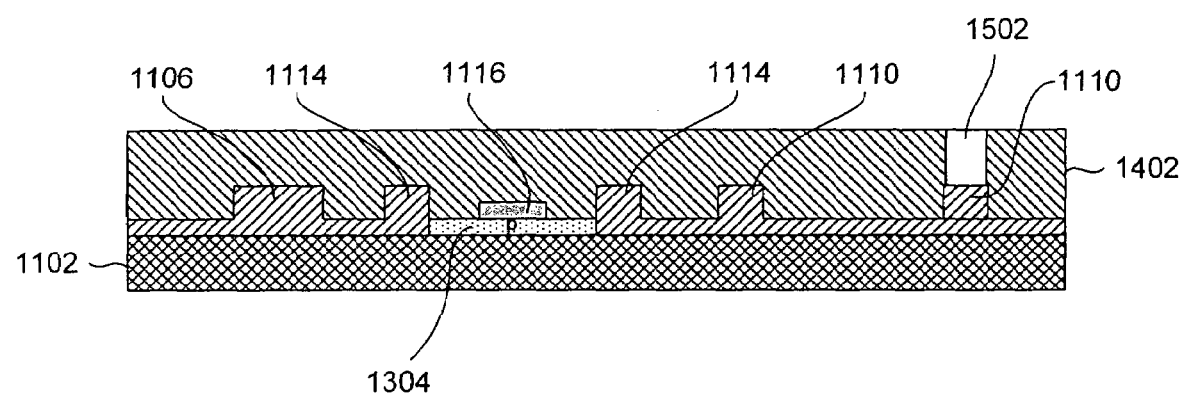
FIG. 15B illustrates a cross-sectional view of the photonic component shown in FIG. 15A that represent an embodiment of the present invention.

Next, holes are etched into the barrier layer using either ion etching or lithography, each hole exposing a portion of the top surface of the first microring of each node. FIG. 15A illustrates a perspective view of a hole 1502 etched into the barrier layer 1402 that represents an embodiment of the present invention. The hole 1502 is located directly above a portion of the top surface of the microring 1110. FIG. 15B illustrates a cross-sectional view of the hole 1502 etched into the barrier layer 1402 that represents an embodiment of the present invention. As shown in FIG. 15B, the hole 1502 exposes a portion of the top surface of the microring 1110. Note that the shape of the hole 1502 is circular. However, methods of the present invention are not limited to forming circular holes in the barrier layer. The holes may actually range in diameter and shape. For example, the shape of the hole 1502 can be elliptical, square, rectangular, triangular, or an irregular shape, and the holes size can be varied as needed.

Figure 16A:
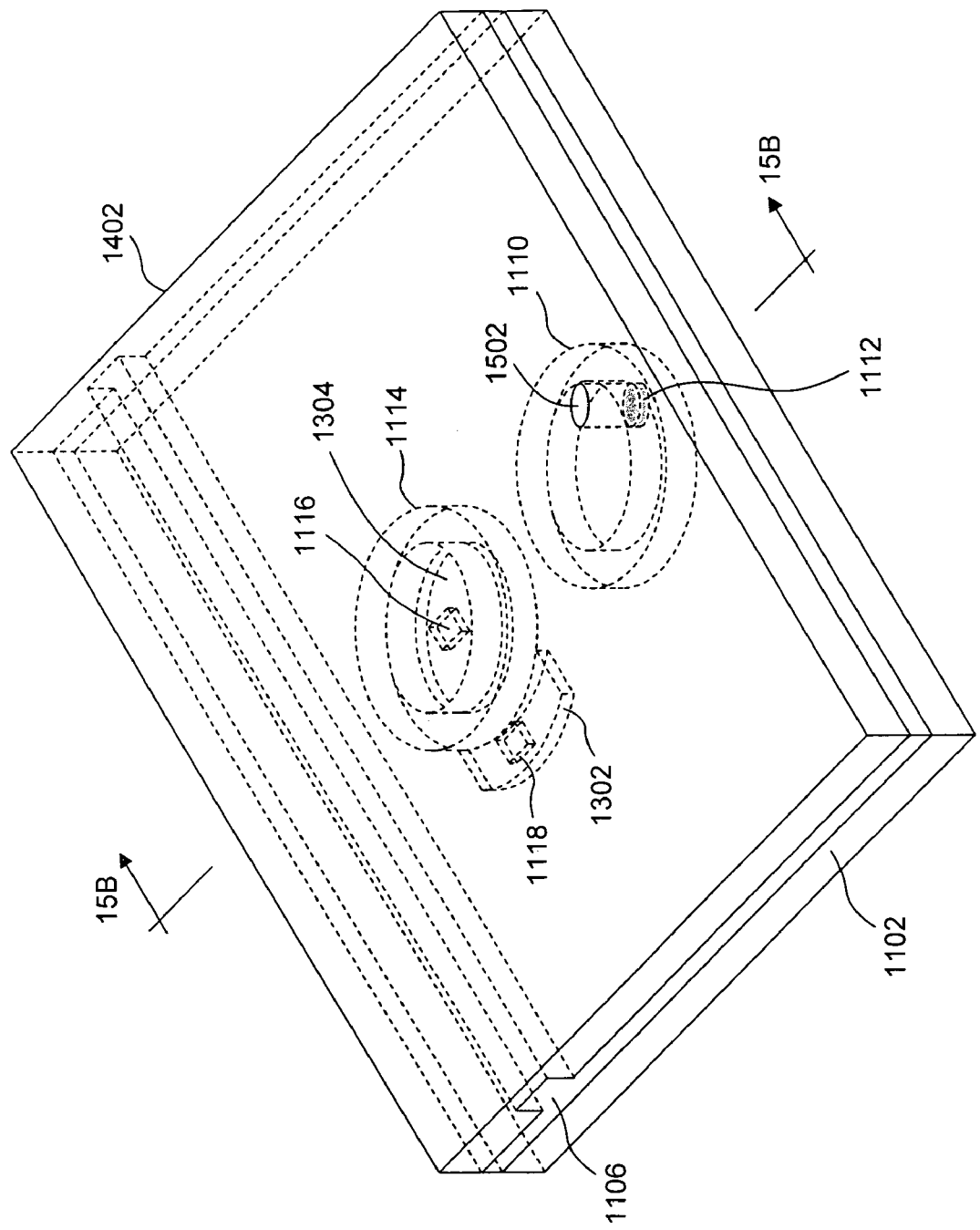
FIG. 16A illustrates a perspective view of quantum dots deposited on a microring of the photonic component shown in FIG. 15 that represents an embodiment of the present invention.
Figure 16B:
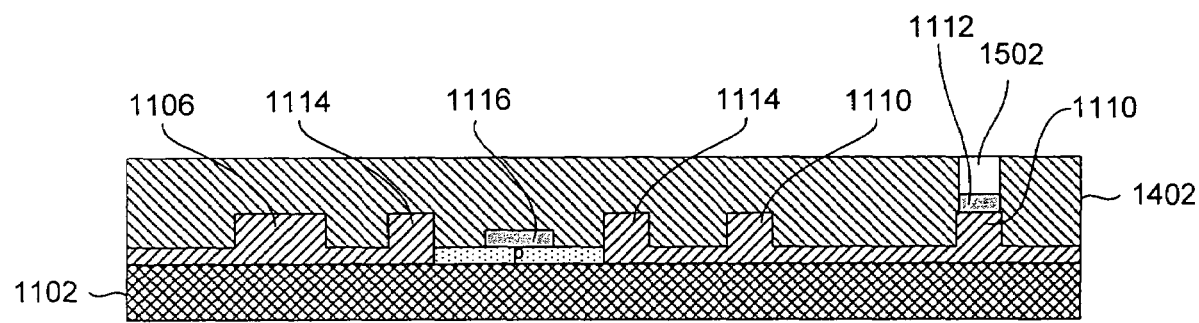
FIG. 16B illustrates a cross-sectional view of the photonic component shown in FIG. 16A that represents an embodiment of the present invention.

Next, a number of QDs are deposited in each hole of the barrier layer using CVD or MBE. FIG. 16A illustrates a perspective view of the QDs 1112 deposited on a portion of the top surface of the microring 1110 that represents an embodiment of the present invention. FIG. 16B illustrates a cross-sectional view of the QDs 1112 deposited on a portion of the top surfaces of the microring 1110 that represents an embodiment of the present invention. As a result, a barrier layer covers the top surface of the photonic chip 1100 except directly above the QDs.

Figure 17A:
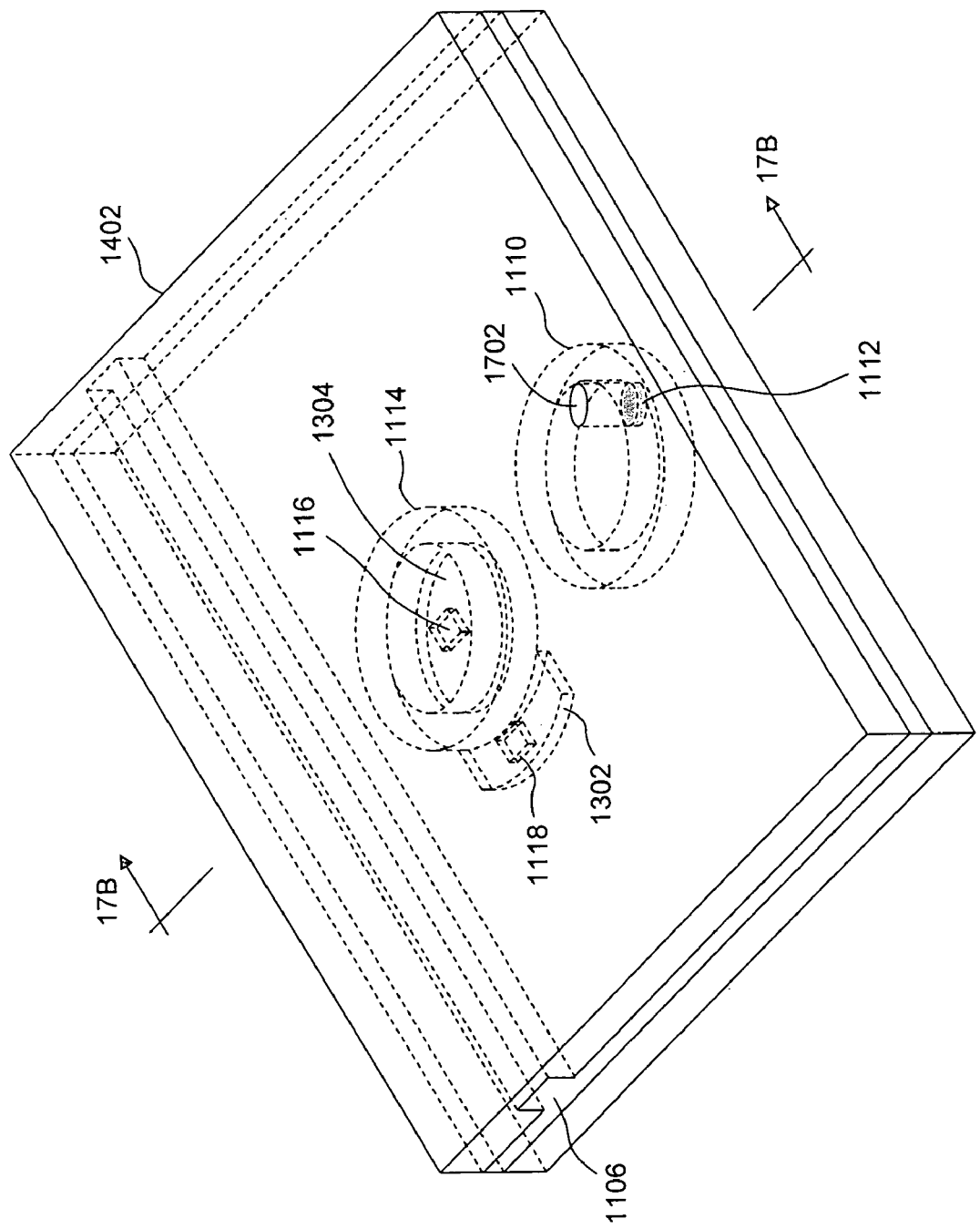
FIG. 17A illustrates a perspective view of the photonic component shown in FIG. 16 after the hole in the barrier layer has been filled with capping material that represents an embodiment of the present invention.
Figure 17B:
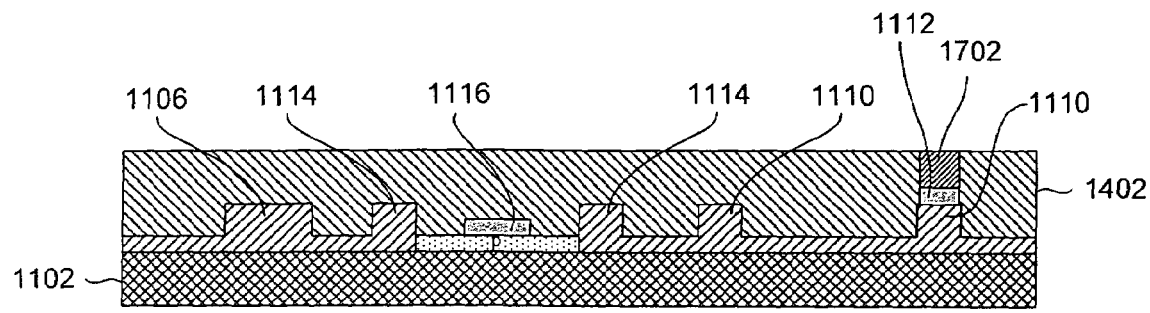
FIG. 17B illustrates a cross-sectional view of the photonic component shown in FIG. 17A that represents an embodiment of the present invention.

Next, caps can be deposited within the holes in the barrier layer. The caps can be comprised of the same semiconductor material used to fabricate the photonic devices. FIG. 17A illustrates a perspective view of the component shown in FIGS. 16A-16B after the hole 1502 has been filled with a cap 1702 that represents an embodiment of the present invention. FIG. 17B illustrates a cross-sectional view of the component shown in FIGS. 16A-16B after the hole 1502 has been filled with the cap 1702 that represents an embodiment of the present invention.

Figure 18A:
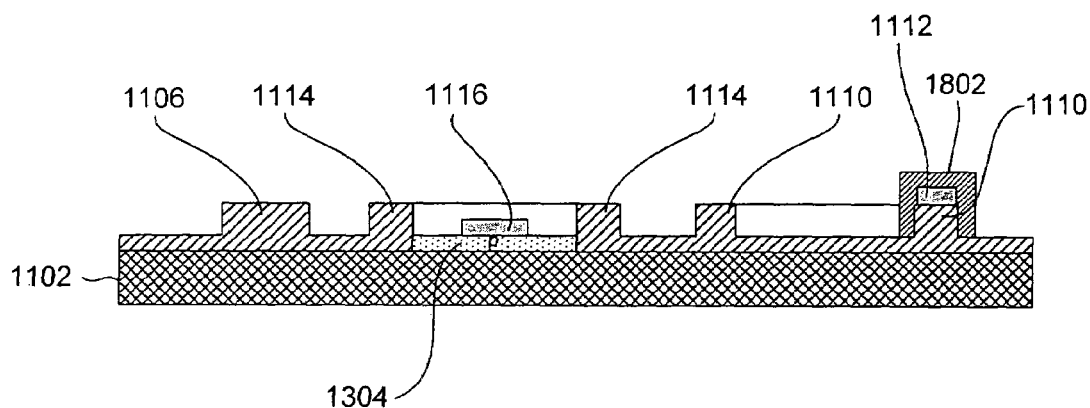
FIG. 18A illustrates a perspective view of the photonic component shown in FIG. 16 after the barrier layer has been replaced by a capping layer that represents an embodiment of the present invention.
Figure 18B:
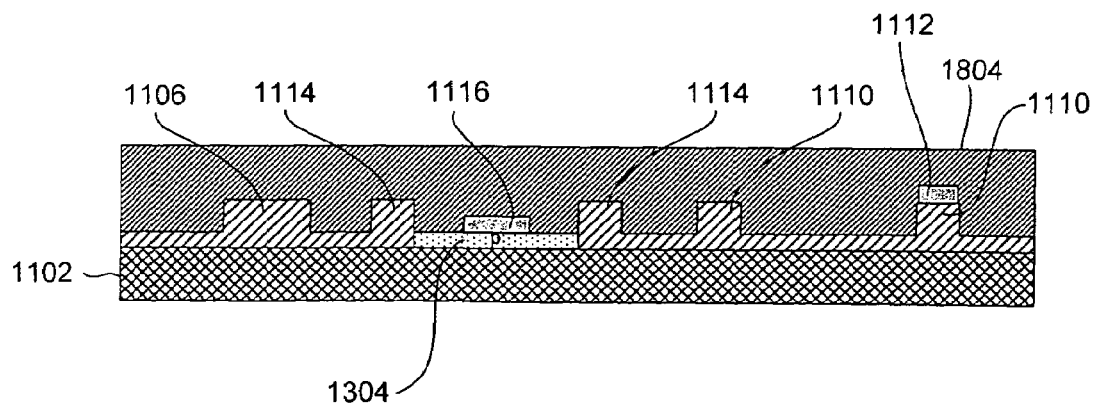
FIG. 18B illustrates a cross-sectional view of the photonic component shown in FIG. 18A that represents an embodiment of the present invention.

In an alternate embodiment of the present invention, rather than filling the holes in the barrier layer, as described above with reference to FIGS. 17A-17B, the barrier layer 1402 can be removed after the QDs have been deposited and a thin capping layer can be deposited over the entire surface of the photonic chip or caps can be deposited selectively over the individual QDs. FIG. 18A illustrates a cross-sectional view of a capping layer 1802 that has been deposited over the QDs 1112 that represents an embodiment of the present invention. FIG. 18B illustrates a cross-sectional view of a thin capping layer that has been deposited over the entire photonic component surface that represents an embodiment of the present invention.

Figure 19A:
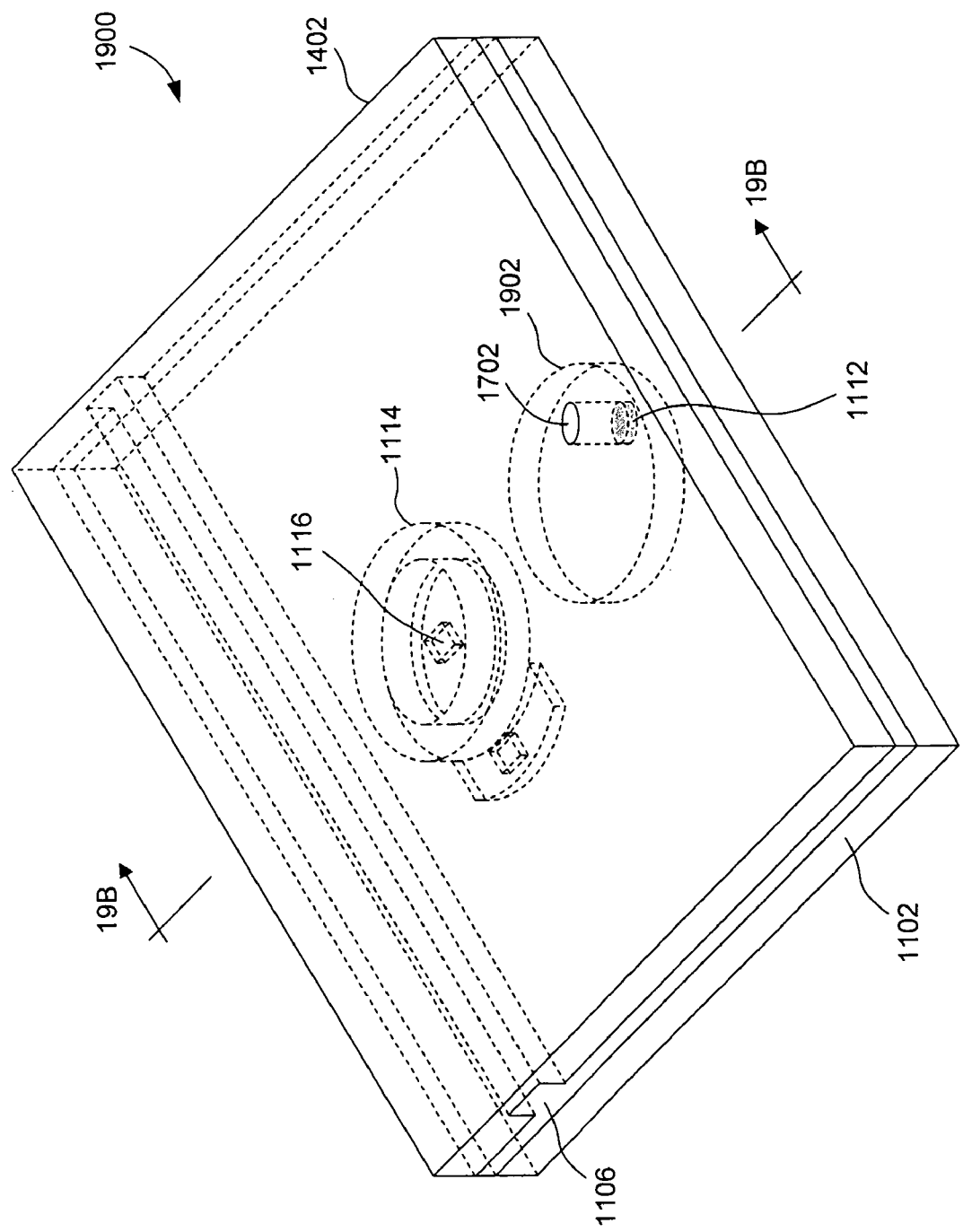
FIG. 19A illustrates a node with a microring and a microdisk that represents an embodiment of the present invention.
Figure 19B:
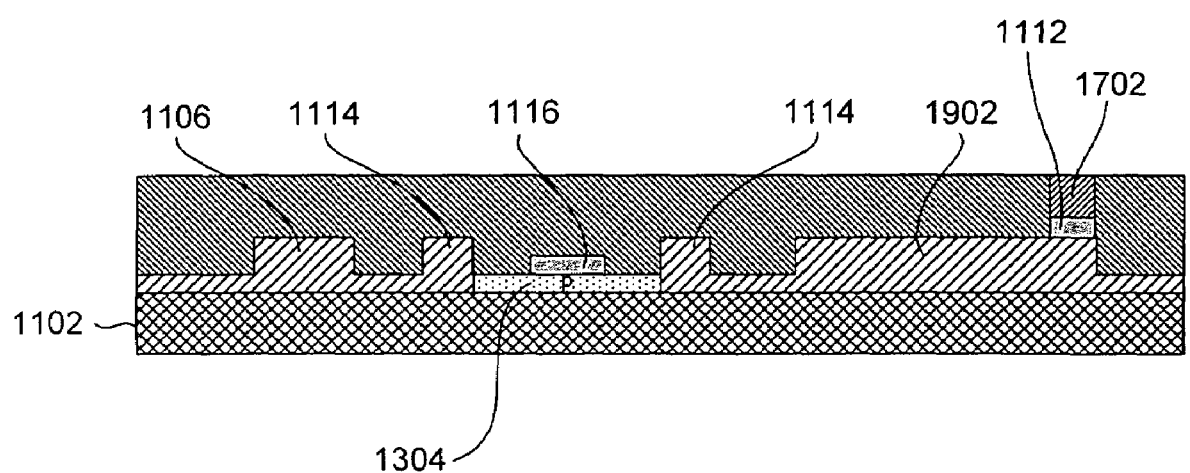
FIG. 19B illustrates a cross-sectional the node shown in FIG. 19A that represents an embodiment of the present invention.

In an alternate embodiment of the present invention, the microrings coupled to the QDs can be replaced with microdisks. FIG. 19A illustrates a node 1900 of a photonic chip that represents an embodiment of the present invention. Comparing FIG. 19A with FIG. 17A shows that the first microring 1110 has been replaced by a microdisk 1902. FIG. 19B illustrates a cross-sectional view of the node 1900 that represents an embodiment of the present invention. In FIG. 19B, the microdisk 1902 is located on the top surface of the substrate 1102, and the QDs 1112 are located near the edge of the top surface of the first microdisk 1902.

In an alternate embodiment of the present invention, the electrodes alone can be used to change the refractive index of the second microring 1114. In other words, a photonic chip 1100 can be fabricated without the n- and p-regions and a voltage bias can be applied to the electrodes of a switch to change the refractive index of an associated second microdisk.

Figure 20B:
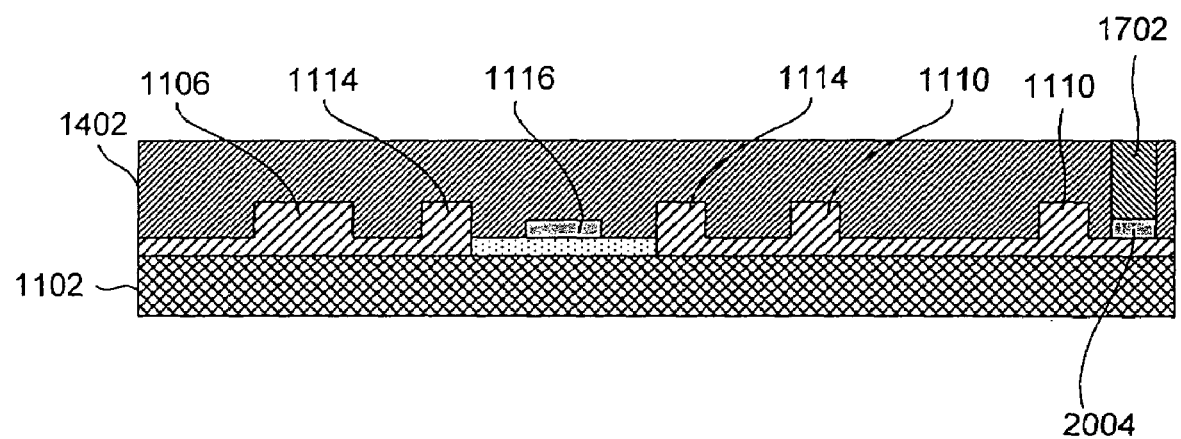
FIG. 20B illustrates a cross-sectional view of the node shown in FIG. 20A that represents an embodiment of the present invention.

Note that in the above described embodiments of the present invention, the QDs of the photonic chip 1100 are located on a portion of the microring 1100, or microdisks 1902, that is farthest from the second microring 1114. However, system and method embodiments of the present invention are not limited to locating the QDs on a portion of the microring that is farthest from the second microring 1114. In alternate embodiments of the present invention, the QDs may be located anywhere near the edge of the top surface of the first microring 1110, or the microdisk 1902. In addition, in an alternate embodiment of the present invention, the QDs can be located on the top surface of the substrate near the first microring 1110, in FIG. 11, or the microdisk 1902, in FIG. 19. FIG. 20A illustrates a perspective view of a node 2002 that represents an embodiment of the present invention. FIG. 20B illustrates a cross-sectional view of the node 2002 that represents an embodiment of the present invention. In FIGS. 20A-20B, the QDs 2004 are located on the surface next to the first microring 1110.

FIG. 21 illustrates a second QD-based photonic chip 2100 that represents an embodiment of the present invention. The photonic chip 2100 is an example of a quantum computer architecture that comprises a quantum network of 20 identically configured nodes, such as node 2104, and 4 bus ridge waveguides 2106-2109 that are located on the top surface of a substrate 2102. The node 2104 comprises QDs 2110 located on a resonant cavity of a photonic crystal 2112, a microring 2114, a ridge waveguide 2116, a first electrode 2118, and a second electrode 2120. The bus waveguides 2106-2109 are coupled to optical fiber input/output couplers 2124-2127, respectively. The bus waveguides 2106-2109 and the microrings are II-IV semiconductors or III-V semiconductors that have a relatively higher refractive index than the dielectric material comprising the substrate 2102, as described above with reference to FIG. 11. The substrate 2102 serves as a cladding layer for electromagnetic waves transmitted in the photonic crystals, the microrings, the ridge waveguides, and the bus waveguides 2106-2109.

Electromagnetic waves are transmitted between the bus waveguide 2106, the microring 2114, and the ridge waveguide 2116 via evanescent coupling, as described above with reference to FIG. 11. The microring 2114 can serve as a drop/add filter for an electromagnetic wave of a particular wavelength. The electromagnetic wave can then be transmitted to the QDs 2110 via a waveguide 2122 in the photonic crystal 2112. Each node QDs can be used to store a quantum bit of information and the photonic chip 2100 can be operated as a processor, memory array, or any other device for quantum computing, quantum processing, or data storage. In addition, each microring and associated first and second electrodes comprise a node on/off switch, which can be used to control the transmission of an electromagnetic wave between a bus waveguide and a ridge waveguide by changing the refractive index of the microring 2114, as described above with reference to FIG. 11.

Figure 22:
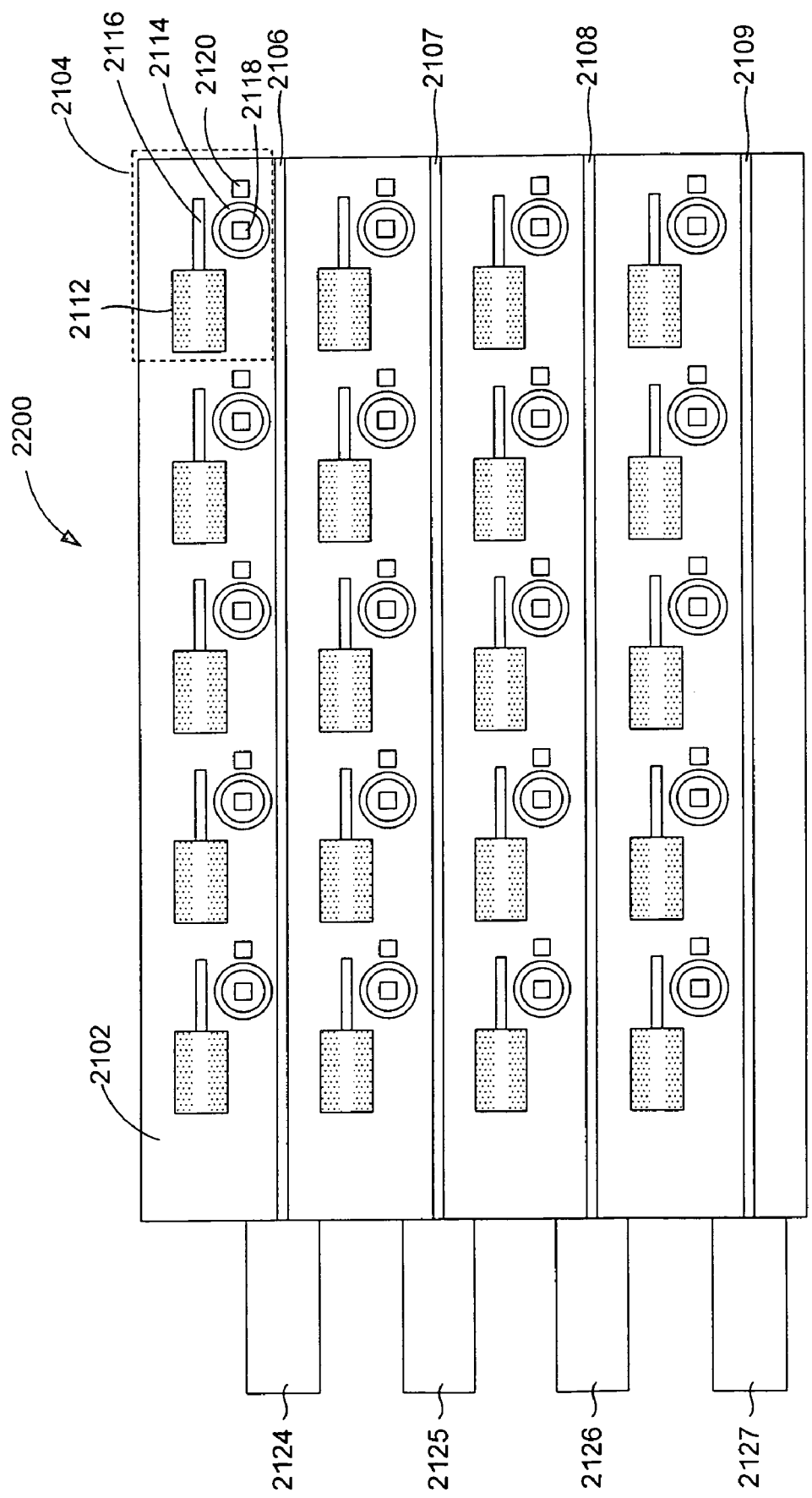
FIG. 22 illustrates a photonic chip that represents an embodiment of the present invention.

One embodiment of the methods for fabricating the QD-based photonic chip 2100 is described below with reference to FIGS. 22-28. FIG. 22 illustrates a photonic chip 2200 that represents an embodiment of the present invention. The chip 2200 comprises the same configuration of photonic devices described above with reference to the QD-based photonic chip 2100, in FIG. 21, except that chip 2200 does not include the QDs on the resonant cavities of the photonic crystals. The chip 2200 can be fabricated as described above with reference to FIG. 12.

Figures 23A, 23B:
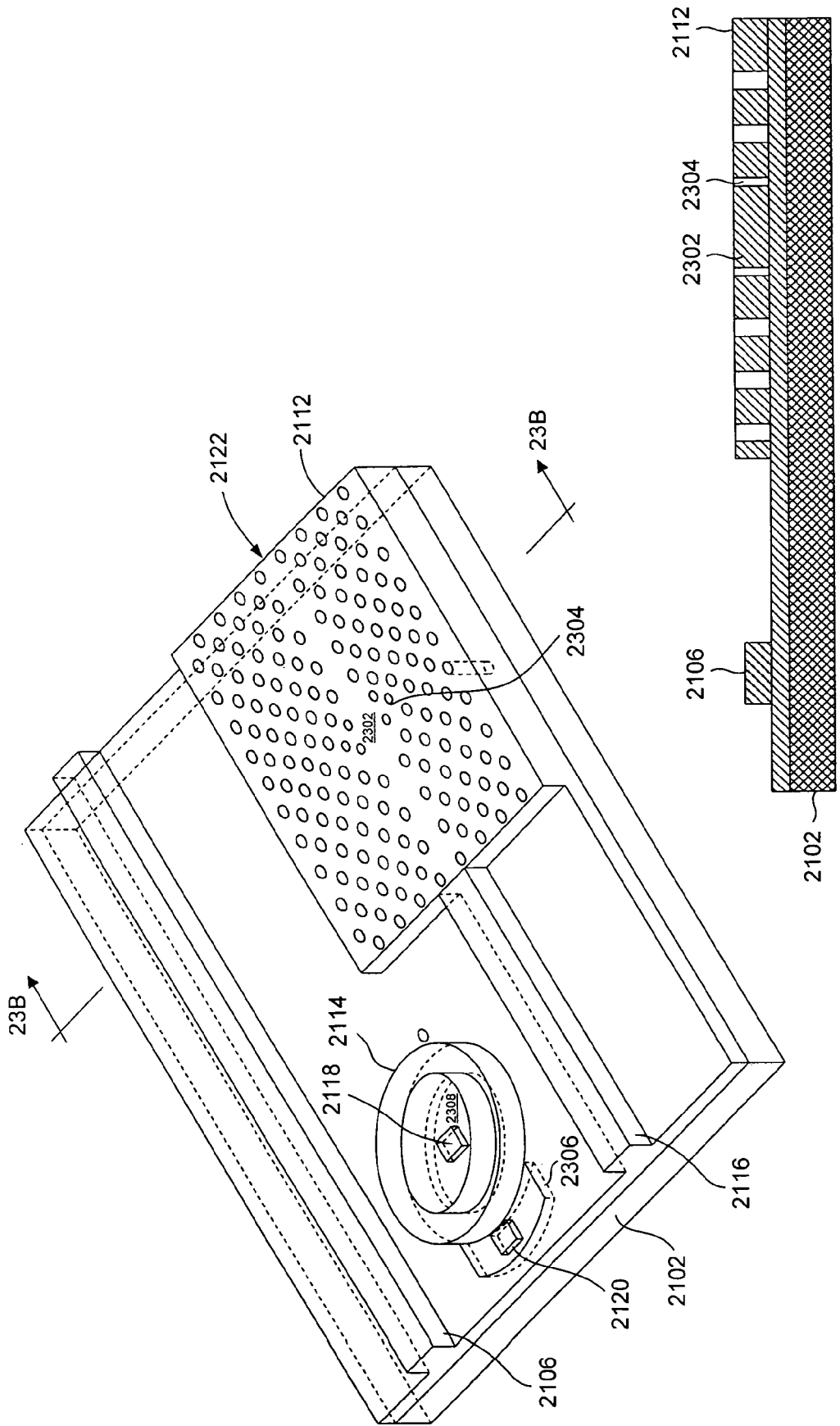
FIG. 23A illustrates a perspective view of a photonic component of the quantum-dot-based photonic chip shown in FIG. 21 that represents an embodiment of the present invention.
FIG. 23B illustrates a cross-sectional view of the photonic component shown in FIG. 23A that represents an embodiment of the present invention.

FIG. 23A illustrates a perspective view of a photonic component 2104 and a portion of the bus waveguide 2106 after the chip 2200 has been fabricated that represents an embodiment of the present invention. The chip 2100 can be fabricated as described above with reference to the chip 1200 shown in FIG. 12. The second microring 2114 is located between the bus waveguide 2106 and the ridge waveguide 2116. The photonic crystal 2112 includes a resonant cavity 2302 within the waveguide 2122. The resonant cavity 2302 is outlined by six cylindrical holes with diameters smaller than the cylindrical holes comprising the remainder of the photonic crystal 2112, such as cylindrical hole 2304. The photonic component also includes a negatively-doped region 2306 and a positively doped region 2308. The n-region 1306 and the p-region 1308 are defined in the substrate 2102 using ion implantation to form a p-i-n junction as described above with reference to FIG. 12. FIG. 23B illustrates a second cross-sectional view of the photonic component 2104 that represents an embodiment of the present invention.

After the photonic chip 2100 has been fabricated, a barrier layer is deposited over the top surface of the photonic chip 2100. FIG. 24A illustrates a perspective view of a barrier layer 2402 deposited on the top surface of the photonic component 2204 and a portion of the adjacent bus waveguide 2106 that represents an embodiment of the present invention. FIG. 24B illustrates a cross-sectional view of the photonic component shown in FIG. 24A that represents an embodiment of the present invention. As shown in FIG. 24B, the barrier layer also fills the holes in the photonic crystal 2112. Note that in practice, however, the barrier layer material may only partially fill a number of the cylindrical holes. The refractive index of the microring 2114, the bus waveguide 2106, the ridge waveguide 2116, and the photonic crystal 2112 can be more than twice the refractive index of the dielectric material comprising the barrier layer 2402. As a result, the barrier layer 2402 can serve as a cladding layer.

Next, a hole is etched into the barrier layer above each resonant cavity of each photonic crystal using ion etching or lithography. Each hole exposes a portion of the top surface of each resonant cavity. FIG. 25A illustrates a hole 2502 etched into the barrier layer 2402 directly above a portion of the top surface of the resonant cavity 2302 that represents an embodiment of the present invention. FIG. 25B illustrates a cross-sectional view of the hole 2502 etched into the barrier layer 2402 that represent an embodiment of the present invention. As shown in FIG. 25B, the hole 2502 exposes a portion of the top surface of the resonant cavity 2302. Note that the holes may actually range in diameter and shape, as described above with reference to FIG. 15.

Next, a number of QDs are deposited in each hole of the barrier layer and onto a portion of the top surface of each resonant cavity using CVD or MBE. FIG. 26A illustrates a perspective view of the QDs 2110 deposited in the hole 2502 and onto the top surface of the resonant cavity 2302 that represents an embodiment of the present invention. FIG. 26B illustrates a cross-sectional view of the QDs 2110 deposited on the top surface of the resonant cavity 2302 that represents an embodiment of the present invention.

Next, caps can be deposited in the holes in the barrier layer. The capping material can be comprised of semiconductor materiel used to fabricate the photonic devices. FIG. 27A illustrates a perspective view of the photonic component shown in FIGS. 26A-26B after a cap 2702 has been deposited in the hole 2502 shown in FIGS. 25 and 26 that represents an embodiment of the present invention. FIG. 27B illustrates a cross-sectional view of the photonic component shown in FIG. 27A that represents an embodiment of the present invention.

Figure 28A:
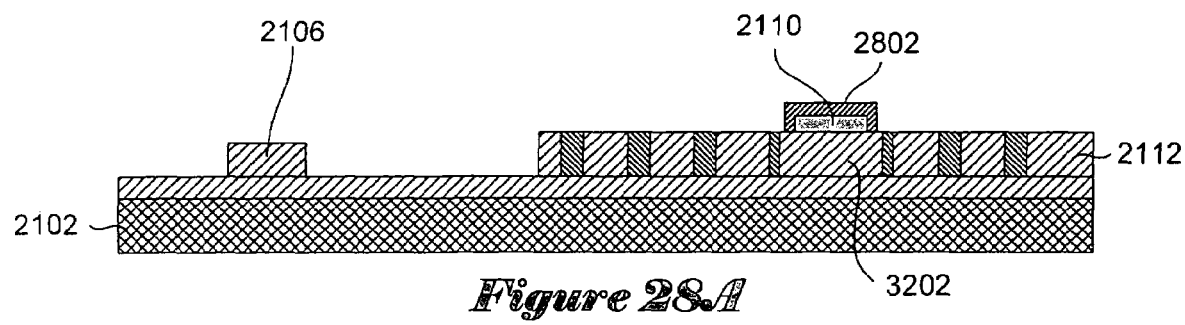
FIG. 28A illustrates a perspective view of the photonic component shown in FIG. 26 after the barrier layer has been replaced by a capping layer that represents an embodiment of the present invention.
Figure 28B:
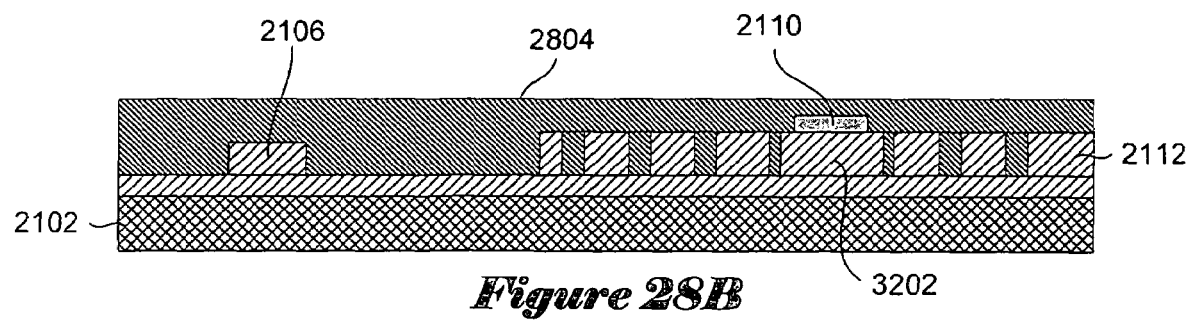
FIG. 28B illustrates a cross-sectional view of the photonic component shown in FIG. 28A that represents an embodiment of the present invention.

In an alternate embodiment of the present invention, rather than filling the holes in the barrier layer, as described above with reference to FIGS. 27A-27B, the barrier layer 2402 can be removed after the QDs have been deposited and a thin capping layer can be deposited over the entire surface of the photonic chip or caps can be deposited selectively over the individual QDs. FIG. 28A illustrates a cross-sectional view of a cap 2802 deposited over the QDs 2110 only that represents an embodiment of the present invention. FIG. 28B illustrates a cross-sectional view of a thin layer 2804 of capping material deposited over the entire surface that represents an embodiment of the present invention.

In an alternate embodiment of the present invention, after the holes are etched in the barrier layer to expose a portion of the top surface of the resonant cavity 2302, as described above with reference to FIGS. 25A-25B, a second set of holes can be etched part way into the resonant cavities. FIG. 29A illustrates a perspective view of a second hole 2902 etched into the resonant cavity 2302 of the photonic crystal 2112 that represents an embodiment of the present invention. FIG. 29B illustrates a cross-sectional view of the second hole 2902 etched into the resonant cavity 2302 of the photonic crystal 2112 that represents an embodiment of the present invention. As shown in FIG. 29B, the second hole 2902 extends only part way into the resonant cavity 2302.

Figures 30A, 30B:
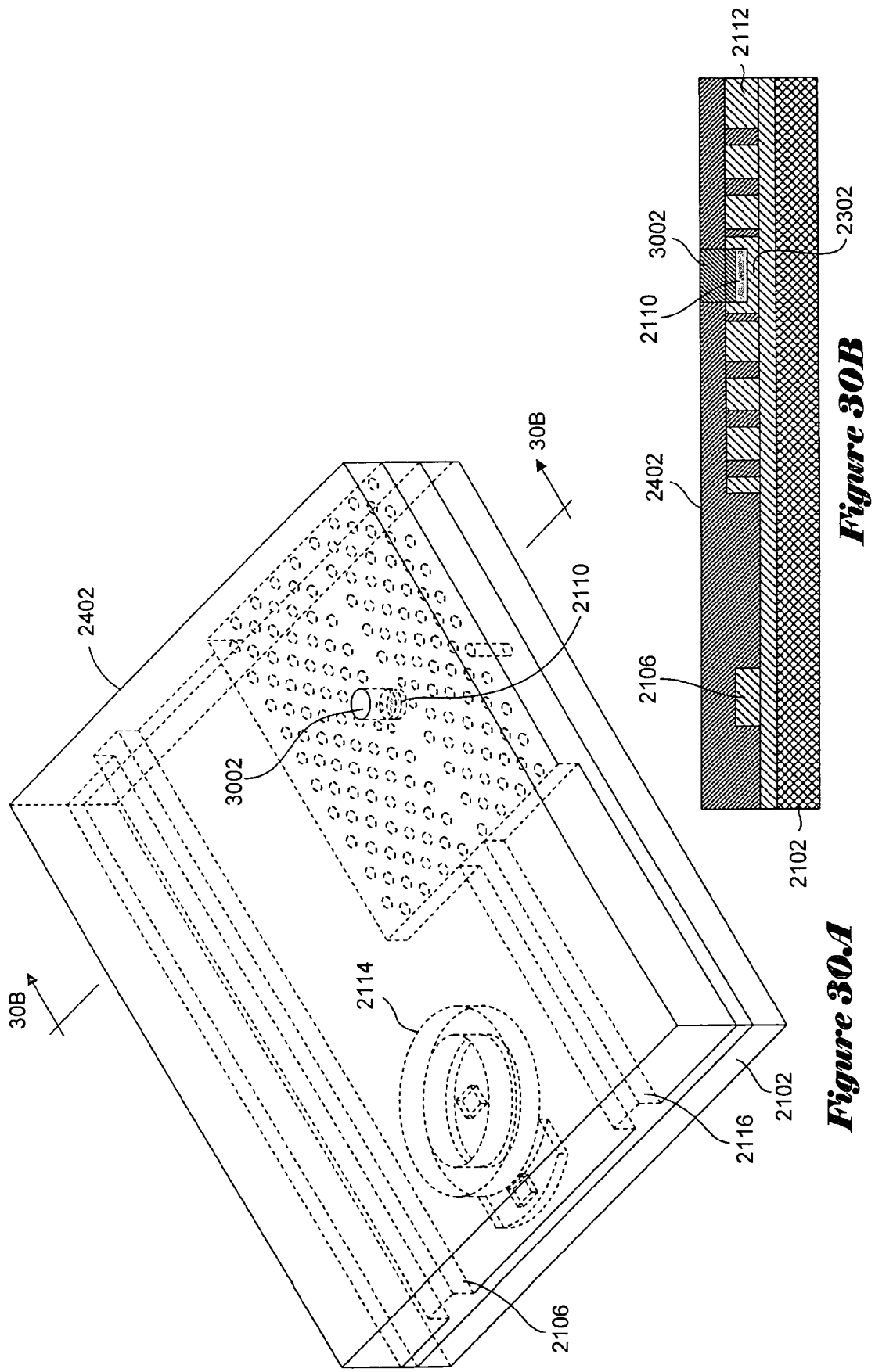
FIG. 30A illustrates a perspective view of quantum dots deposited in the hole in the resonant cavity shown in FIG. 29 that represents an embodiment of the present invention.
FIG. 30B illustrates a cross-sectional view of the resonant cavity shown in FIG. 30A that represents an embodiment of the present invention.

Next, a number of QDs are deposited in each of the second holes in the photonic crystals using CVD or MBE. FIG. 30A illustrates a perspective view of the QDs 2110 and capping material 3002 deposited in the second hole 2902 of the photonic crystal 2112 that represents an embodiment of the present invention. FIG. 30B illustrates a cross-sectional view of the QDs 2110 and capping material 3002 deposited in the second hole 2902 that represents an embodiment of the present invention.

In an alternate embodiment of the present invention, after the QDs and capping material has been deposited in the holes in the resonant cavities, the barrier layer can be removed. FIG. 31A illustrates a perspective view of a node after capping material 3102 has been deposited in the resonant cavity hole 2902 and the barrier layer has been removed. FIG. 31B illustrates a cross-sectional view of the node shown in FIG. 31A that represents an embodiment of the present invention.

Figure 32:
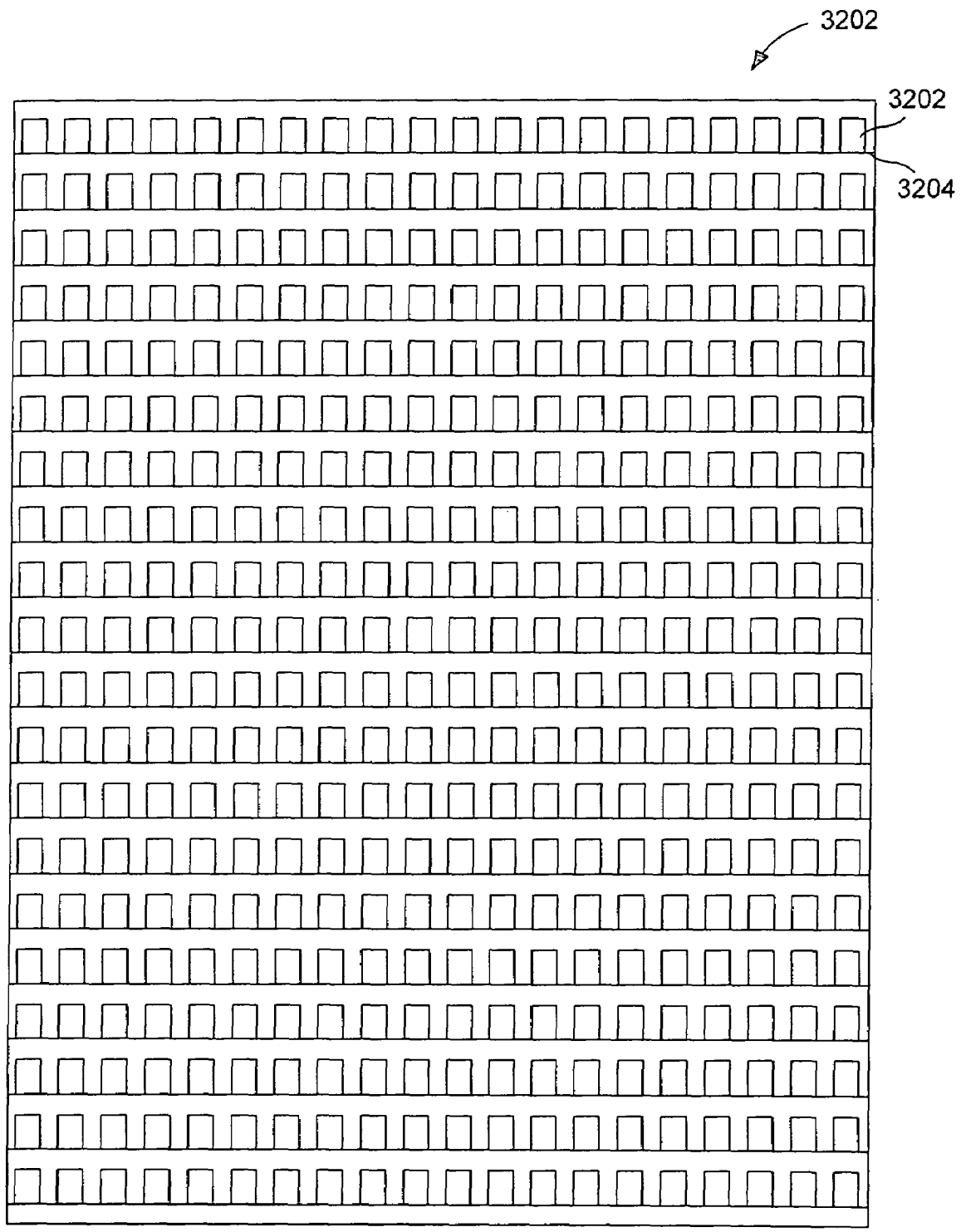
FIG. 32 illustrates a hypothetical quantum-dot-based chip with an array of 400 nodes that represents an embodiment of the present invention.

The QD-based photonic chips 1100 and 2100, shown in FIGS. 11 and 21, are scalable. In other words, the photonic chips 1100 and 2100 can be made to provided more (or less) computational power, memory, or amount of mass storage by configuring each chip with a larger (or smaller) number of nodes. For example, methods of the present invention can be used to configure quantum computer architectures with an unlimited number of nodes. FIG. 32 illustrates a hypothetical photonic chip 3200 with an array of 400 nodes that represents an embodiment of the present invention. In FIG. 32, boxes, such as box 3202, represent nodes, such as node 1104, in FIG. 11, or node 2104, in FIG. 21. Horizontal lines, such as horizontal line 3204, represent bus waveguides that can be coupled to optical fiber input/output couplers.

Figure 33:
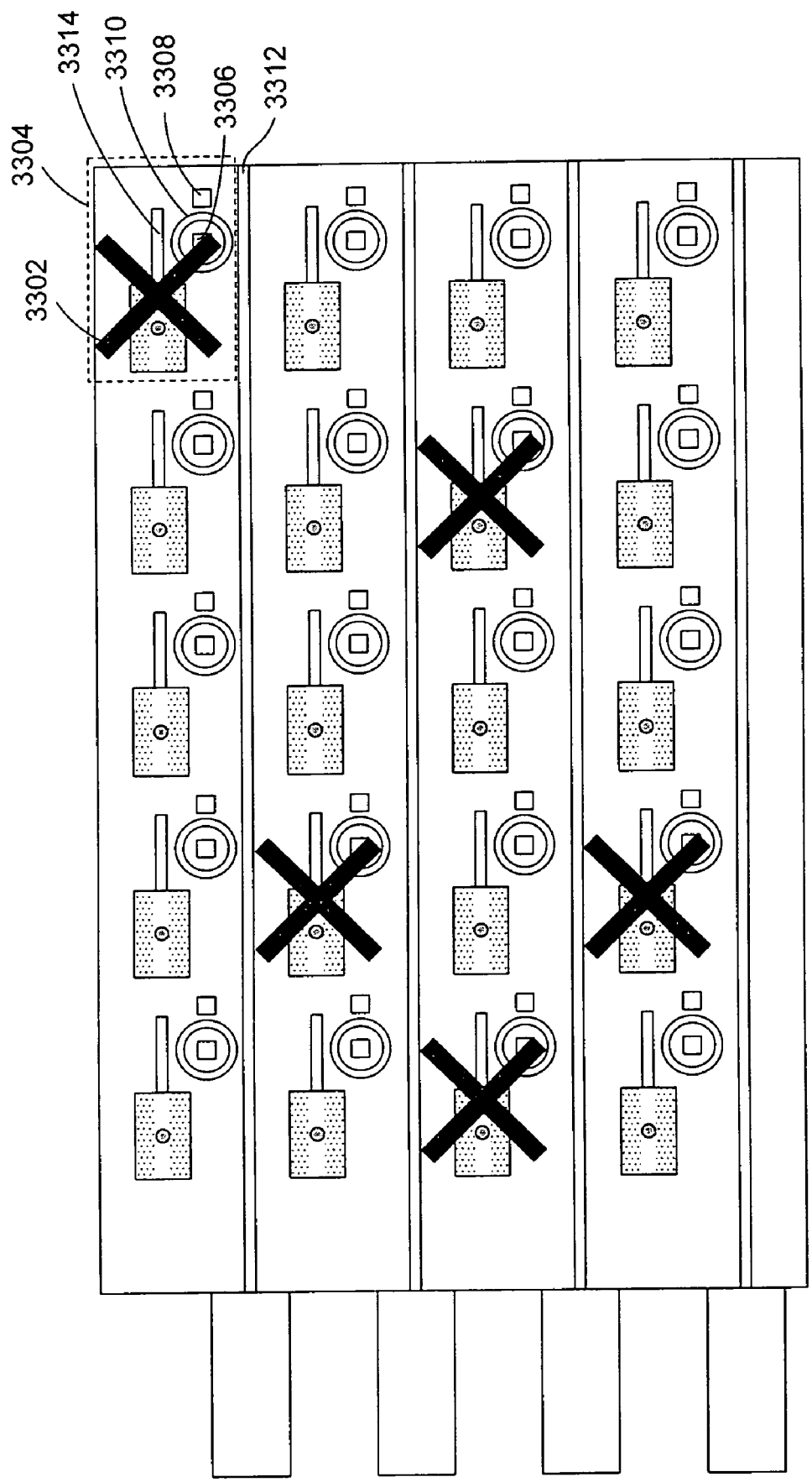
FIG. 33 illustrates the quantum-dot-based chip show in FIG. 21 with 5 defective nodes that represents an embodiment of the present invention.

The QD-base photonic chip 1100 shown in FIG. 11 and the QD-based photonic chip 2100 shown in FIG. 21 described above are also defect tolerant. In other words, the photonic chips 1100 and 2100 can be operated effectively even though a number of the nodes are not operational. The defective nodes can be turned off by changing the refractive index of each switch microring. FIG. 33 illustrates the photonic chip 2100 shown in FIG. 21 with 5 defective nodes that represents an embodiment of the present invention. In FIG. 33, defective nodes are identified by "Xs." For example, "X" 3302 identifies a defective node 3304. Applying an appropriate voltage bias between a first electrode 3306 and a second electrode 3308 changes the refractive index of a microring 3310 so that an electromagnetic wave cannot be transmitted by evanescent coupling between the bus waveguide 3312 and the ridge waveguide 3314.

Figure 34A:
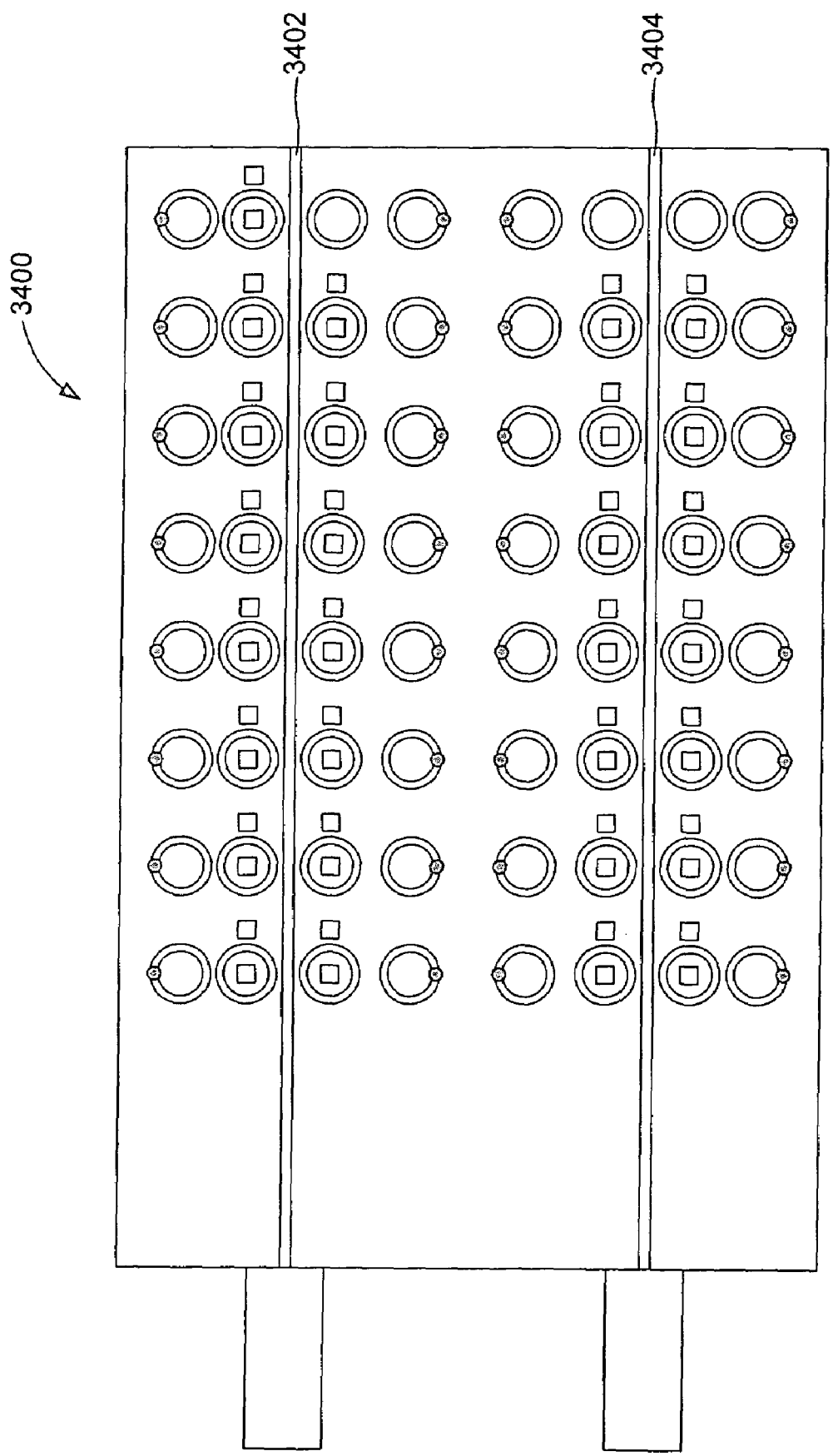
FIG. 34 illustrates a quantum-dot-based chip with two bus waveguides, each bus waveguide coupled to two rows of nodes that represents an embodiment of the present invention

Although the present invention has been described in terms of particular embodiments, it is not intended that the invention be limited to these embodiments. Modifications within the spirit of the invention will be apparent to those skilled in the art. For example, in an alternate embodiment of the present invention, the barrier layer can be selectively deposited over the first microring only of each node or over the photonic crystal only of each node. In an alternate embodiment of the present invention, rather than coupling a single bus waveguide to a single row of nodes, as shown in FIGS. 11 and 21, a single bus waveguide can be couple to two rows of nodes. For example, FIG. 34 illustrates a QD-based photonic chip 3400 with two bus waveguides 3402 and 3404, each bus waveguide coupled to two rows of nodes that represents an embodiment of the present invention. In an alternate embodiment of the present invention, a QD-based photonic chip can be configured with different types of nodes. For example, the nodes 1104 and 2104 can both be used in a single QD-based photonic chip. In an alternate embodiment of the present invention, the photonic crystal 2112 in the QD-based photonic chip 2100 can be replaced with a one-dimensional photonic crystal that includes Fabry-Perot cavities. In an alternate embodiment of the present invention, the switch electrodes can be used to supply heat that changes the refractive index of the coupled microring. In an alternate embodiment of the present invention, the QD-based photonic chips 1100 and 2100, described above, may exclude the electrodes coupled to the microrings. The refractive index of each microring associated with a switch can instead be changed by directly applying an incident electromagnetic wave of a particular wavelength. In alternate embodiments of the present invention, the semiconductor material comprising the photonic devices may include high-index dielectrics, such as SiN. In an alternate embodiment of the present invention, an optical multiplexer/demultiplexer can be used to connect a single optical fiber input/output connection to numerous bus waveguides in a photonic chip. The multiplexer/demultiplexer can be electronically controlled so that individual bus waveguides can be selected for transmitted particular electromagnetic waves.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

What is claimed is:

1. A node of a quantum-dot-based, quantum computer architecture, the node comprising:
    a first photonic device supported by a substrate;
    quantum dots optically coupled to the first photonic device, wherein the quantum dots are located on the top surface of the first photonic device; and
    a switch supported by the substrate and located between the first photonic device and a bus waveguide, wherein the switch controls transmission of electromagnetic waves between the bus waveguide and the first photonic device so that the electromagnetic waves can be selectively coupled into and out of the quantum dots.

2. The node of claim 1 wherein the switch further comprises:
    a second photonic device that optically couples the first photonic device to the bus waveguide, and
    a pair of electrodes that supply a voltage across the second photonic device in order to change the refractive index of the second photonic device.

3. The node of claim 1 wherein the switch further comprises:
    a positively doped substrate region in electrical contact with a first electrode; and
    a negatively doped substrate region in electrical contact with a second electrode.

4. The node of claim 1 wherein the switch further comprises:
    a second photonic device that couples the first photonic device to the bus waveguide;
    a pair of electrodes that supply heat in order to change the refractive index of the second photonic device.

5. The node of claim 1 wherein the switch further comprises a second photonic device that experiences a refractive index change when exposed to an electromagnetic wave of a particular wavelength.

6. The node of claim 1 further comprising a barrier layer that covers the substrate, the first photonic device, the switch, the bus waveguide and is composed of a dielectric material having a smaller refractive index than that of the first and second photonic devices, the switch, and the bus waveguide.

7. The node of claim 1 further comprising a capping layer composed of semiconductor material that covers the quantum dots.

8. The node of claim 1 wherein the first photonic device further comprises one of:
- a microring;
- a microdisk; or
- a resonant cavity of a photonic crystal.

9. The node of claim 1 wherein the first photonic device, and the bus waveguide further comprises one of:
- a high index dielectric;
- a II-IV semiconductor; or
- a Ill-V semiconductor.

10. A method for fabricating quantum dots on a node of a photonic chip, the method comprising:
- providing a node with an photonic device;
- depositing a barrier layer on the node so that the barrier layer covers the photonic device;
- forming a hole in the barrier layer that exposes a portion of a surface of the photonic device;
- depositing a number of quantum dots on the exposed portion of the surface of the photonic device; and
- depositing capping material over the quantum dots.

11. The method of claim 10 further comprises removing the barrier layer.

12. The method of claim 10 wherein the photonic device further comprises one of:
- a microring;
- a microdisk; or
- a resonant cavity of a one-dimensional photonic crystal, or a two-dimensional, photonic crystal.

13. The method of claim 10 further comprises:
- forming a second hole part way into a resonant cavity of a photonic crystal; and
- forming a number of quantum dots in the second hole of the resonant cavity of the photonic crystal, when the photonic device is a photonic crystal with a resonant cavity.

14. The method of claim 10 wherein forming the hole in the barrier layer further comprises one of:
- reactive-ion etching;
- focused ion-beam etching;
- chemically assisted ion-beam etching;
- electron beam lithography;
- photolithography; or
- nanoimprint lithography.

15. A defect-tolerant quantum computer architecture, the quantum computer architecture comprising:
- a bus waveguide supported by a substrate; and
- a one or more nodes supported by the substrate and optically coupled to the bus waveguide, wherein each node includes:
  - a first photonic device,
  - quantum dots optically coupled to the first photonic device, wherein the
  - quantum dots are located on the top surface of the first photonic device, and
  - a switch located between the first photonic device and the bus waveguide, wherein the switch selectively controls transmission of electromagnetic waves between the bus waveguide and the first photonic device so that the electromagnetic waves can be coupled into and out of the quantum dots.

16. The quantum computer architecture of claim 15 wherein the switch further comprises:
- a second photonic device that optically couples the first photonic device to the bus waveguide, and
- a pair of electrodes that supply a voltage across the second photonic device, the voltage changes the refractive index of the second photonic device.

17. The quantum computer architecture of claim 15 wherein the switch further comprises a p-i-n junction.

18. The quantum computer architecture of claim 17 wherein the p-i-n junction further comprises:
- a positively doped substrate region in electrical contact with a first electrode; and
- a negatively doped substrate region in electrical contact with a second electrode.

19. The quantum computer architecture of claim 15 wherein the switch further comprises:
- a second photonic device that couples the first photonic device to the bus waveguide;
- a pair of electrodes that supply heat to change the refractive index of the second photonic device.

20. The quantum computer architecture of claim 15 wherein the switch further comprises a second photonic device that experiences a refractive index change when exposed to an electromagnetic wave of a particular wavelength.

21. The quantum computer architecture of claim 20 further comprising an optional barrier layer that covers the optical devices and serves as a cladding layer.

22. The quantum computer architecture of claim 20 wherein the first photonic device further comprises one of:
- a microring;
- a microdisk; or
- a resonant cavity of a one-dimensional, or a two-dimensional, photonic crystal.

23. The quantum computer architecture of claim 15 wherein the first photonic device, and the bus waveguide further comprise one of:
- a high index dielectric;
- a II-IV semiconductor; or
- a III-V semiconductor.

24. The quantum computer architecture of claim 15 wherein the quantum computer architecture is scalable.

25. The quantum computer architecture of claim 15 further comprising a multiplexer/demultiplexer that connects a single optical fiber input/output connection to one or more of the bus waveguides.

* * * * *

UNITED STATES PATENT AND TRADEMARK OFFICE
CERTIFICATE OF CORRECTION

PATENT NO.         : 7,529,437 B2                                        Page 1 of 1
APPLICATION NO. : 11/494814
DATED              : May 5, 2009
INVENTOR(S)        : Sean Spillane et al.

It is certified that error appears in the above-identified patent and that said Letters Patent is hereby corrected as shown below:

In column 21, line 6, in Claim 9, delete "device," and insert -- device --, therefor.

In column 22, line 43, in Claim 23, delete "device," and insert -- device --, therefor.

Signed and Sealed this

Sixth Day of October, 2009

David J. Kappos
*Director of the United States Patent and Trademark Office*